US012675666B2

(12) United States Patent
Spieth et al.

(10) Patent No.: US 12,675,666 B2
(45) Date of Patent: Jul. 7, 2026

(54) LIMIT VALUE DETECTION DEVICE COMPRISING A COUNTING UNIT

(71) Applicant: Hahn-Schickard-Gesellschaft für angewandte Forschung e.V., Stuttgart (DE)

(72) Inventors: Sven Spieth, Dauchingen (DE); Simon Herrlich, Unterkirnach (DE); Daniel Hoffmann, Villingen-Schwenningen (DE)

(73) Assignee: HAHN-SCHICKARD-GESELLSCHAFT FÜR ANGEWANDTE FORSCHUNG E.V., Stuttgart (DE)

( * ) Notice: Subject to any disclaimer, the term of this patent is extended or adjusted under 35 U.S.C. 154(b) by 0 days.

(21) Appl. No.: 19/026,583

(22) Filed: Jan. 17, 2025

(65) Prior Publication Data

US 2025/0156673 A1 May 15, 2025

Related U.S. Application Data

(63) Continuation of application No. PCT/EP2023/071206, filed on Jul. 31, 2023.

(30) Foreign Application Priority Data

Aug. 12, 2022 (DE) ..................... 10 2022 208 428.4

(51) Int. Cl.
*G06M 1/08* (2006.01)
*G06M 1/14* (2006.01)

(52) U.S. Cl.
CPC .............. *G06M 1/083* (2013.01); *G06M 1/14* (2013.01)

(58) Field of Classification Search
CPC ................................ G06M 1/083; G06M 1/14
(Continued)

(56) References Cited

U.S. PATENT DOCUMENTS 4,244,515 A * 1/1981 Kondo .................. G06M 1/283
235/144 HC
5,969,315 A 10/1999 Schulze
(Continued)

FOREIGN PATENT DOCUMENTS

DE 19721964 A1 12/1998
DE 102005039333 A1 2/2007
(Continued)

OTHER PUBLICATIONS

Machine Translation of DE19721964A1 to Bartels (Year: 1997).*
(Continued)

*Primary Examiner* — Daniel A Hess
(74) *Attorney, Agent, or Firm* — PV IP PC; Wei Te Chung

(57) ABSTRACT

A limit value detection device for multiple detection of a limit value event has a catch mechanism manufactured using microstructuring technology, having a first and a second catch element, each having a plurality of catches, a pawl configured to engage in a catch intermediate space between two adjacent catches of the first catch element, the first catch element being movable relative to the pawl in a freewheeling direction and movement thereof relative to the pawl in a blocking direction being blockable by the pawl, and an actuating device configured to move the first catch element and the pawl relative to each other in a catch-by-catch manner in the freewheeling direction. The first and second catch elements together form a counting unit in which the counter status for indicating the detected limit value events is determined based on the position of the two catch elements relative to each other.

18 Claims, 9 Drawing Sheets

(58) Field of Classification Search
USPC .......................................................... 235/142
See application file for complete search history.

(56) References Cited

U.S. PATENT DOCUMENTS

| | | | |
|---|---|---|---|
| 7,255,263 | B2 | 8/2007 | Isaacson et al. |
| 11,037,047 | B2 | 6/2021 | Christie et al. |

FOREIGN PATENT DOCUMENTS

| | | | |
|---|---|---|---|
| DE | 102016220111 | B3 | 2/2018 |
| EP | 1390767 | B1 | 8/2008 |

OTHER PUBLICATIONS

International Search Report in International application No. PCT/EP2023/071206, mailed on Oct. 11, 2023.
Written Opinion of the International Search Authority in International application No. PCT/EP2023/071206, mailed on Oct. 11, 2023.

* cited by examiner

| cycles | Z1 | Z2 | code | |
|---|---|---|---|---|
| 0 | 1 | 1 | 1-1 | |
| 1 | 2 | 2 | 2-2 | |
| 2 | 3 | 3 | 3-3 | |
| 3 | 1 | 4 | 1-4 | |
| 4 | 2 | 5 | 2-5 | |
| 5 | 3 | 1 | 3-1 | |
| 6 | 1 | 2 | 1-2 | |
| 7 | 2 | 3 | 2-3 | |
| 8 | 3 | 4 | 3-4 | |
| 9 | 1 | 5 | 1-5 | |
| 10 | 2 | 1 | 2-1 | |
| 11 | 3 | 2 | 3-2 | |
| 12 | 1 | 3 | 1-3 | |
| 13 | 2 | 4 | 2-4 | |
| 14 | 3 | 5 | 3-5 | |
| 15 | 1 | 1 | 1-1 | repeat |

Fig. 2

| cycles | Z1 | Z2 | code | |
|---|---|---|---|---|
| 0 | 1 | 1 | 1-1 | |
| 1 | 1 | 2 | 1-2 | |
| 2 | 1 | 3 | 1-3 | |
| 3 | 1 | 4 | 1-4 | |
| 4 | 1 | 5 | 1-5 | |
| 5 | 2 | 1 | 2-1 | |
| 6 | 2 | 2 | 2-2 | |
| 7 | 2 | 3 | 2-3 | |
| 8 | 2 | 4 | 2-4 | |
| 9 | 2 | 5 | 2-5 | |
| 10 | 3 | 1 | 3-1 | |
| 11 | 3 | 2 | 3-2 | |
| 12 | 3 | 3 | 3-3 | |
| 13 | 3 | 4 | 3-4 | |
| 14 | 3 | 5 | 3-5 | |
| 15 | 1 | 1 | 1-1 | repeat |

Fig. 5

LIMIT VALUE DETECTION DEVICE COMPRISING A COUNTING UNIT

CROSS-REFERENCE TO RELATED APPLICATIONS

This application is a continuation of copending International Application No. PCT/EP2023/071206, filed Jul. 31, 2023, which is incorporated herein by reference in its entirety, and additionally claims priority from German Application No. 10 2022 208 428.4, filed Aug. 12, 2022, which is also incorporated herein by reference in its entirety.

TECHNICAL FIELD

The invention relates to a device for multiple detection of limit value events. Such limit value events are defined in that a predefined threshold value is fallen below or exceeded. These may be, for example, threshold values of a pressure, a temperature, an acceleration, a mechanical force, and the like.

BACKGROUND OF THE INVENTION

Detecting and identifying such exceeding or falling below limit values in a considered time period may be of importance in various industrial processes. One of numerous examples relates, for example, to critical temperature loads during product production, in the logistics chain, during product use or, generally, in temperature-affected processes on a product.

Nowadays, exceeding acceleration limit values, e.g., in fall sensors in smartphones, or exceeding pressure limit values, e.g., in gas cylinders, are of great interest in industry. Frequently, it is interesting to know how often a predefined limit value has been fallen below or exceeded.

Furthermore, limit value detection devices in the medical or clinical environment are used in the form of so-called sterilization cycle counters in autoclaving. Autoclaving, i.e., steam sterilization of instruments in the clinical environment, is a necessary process in order to be able to ensure germ-free and safe reuse of sterilized medical instruments. However, this process using hot, saturated water vapor often represents a considerable strain on the instruments and must not exceed a certain maximum number.

WO 2018/069 079 A1 describes a generic device for determining limit value events. This device comprises a gearwheel or a toothed rack, in the teeth of which a pawl can engage. After each detected limit value event, the pawl moves on by one tooth. However, the number of limit value events which can be detected by means of this device is always limited exactly to the number of teeth present. That means, in the case of a gearwheel with, for example, twelve teeth (and accordingly twelve tooth gaps into which the pawl can engage), the number of limit value events to be detected is limited to exactly eleven because in the twelfth pass, the initial state at the first tooth is reached again. After a complete pass, the device must be reset again in order to start a new counting process. Otherwise, an overflow occurs, and the device begins to count again at '1' although it has actually detected the twelfth limit value event. In some fields of application, this can result in undesired side effects. Thus, for example, in the case of a sterilization cycle counter which counts the number of sterilization processes of surgical instruments, an incorrect indication of sterilization cycles already taken place could represent a considerable risk for the durability of the surgical instruments and thus also for the safety of the patient to be operated on.

Since the number of limit value events to be detected is limited to the number of catches (latches) or teeth of the catch element (for example a gearwheel), the user must exercise caution when counting the detected limit value events in order not to overlook an overflow. This could be bypassed by increasing the number of possible limit value events to be detected. For this purpose, it would be conceivable to increase the number of catches or teeth. However, the catch element (for example gearwheel) cannot be increased as desired since this would no longer take account of the idea of microstructuring technology.

Therefore, it would be desirable to improve existing microstructured limit value detection devices in that the number of detectable limit value events can be increased considerably, advantageously while maintaining the smallest possible form factor of the microstructured limit value detection device.

SUMMARY

According to an embodiment, a limit value detection device for multiple detection of a limit value event may have: a catch mechanism manufactured using microstructuring technology, having a first catch element and at least a second catch element, wherein each catch element has a plurality of catches each, a pawl configured to engage in a catch intermediate space between two adjacent catches of the first catch element, wherein the first catch element is movable relative to the pawl in a freewheeling direction and movement of the first catch element relative to the pawl in a blocking direction is blockable by means of the pawl, and an actuating device configured to move the first catch element and the pawl relative to each other in a catch-by-catch manner in the freewheeling direction, wherein the catch elements of the catch mechanism together form a counting unit in which the counter status for indicating the detected limit value events is determined on the basis of the position or positioning of the catch elements relative to each other.

The limit value detection device according to the invention comprises, among other things, a catch (or latch) mechanism. The catch mechanism comprises a first catch element having a plurality of catches, and at least a second catch element having a plurality of catches. The catch mechanism may also comprise more than two catch elements. The limit value detection device also comprises at least one pawl configured to engage in a catch intermediate space between two adjacent catches of one of the catch elements. The catch intermediate space is the gap between two catches. The pawl blocks the movement of the catch element in the catches of which the pawl engages, in a first direction. This direction is therefore also referred to as the blocking direction. However, the pawl allows movement in the opposite direction. This direction is therefore also referred to as the freewheeling direction. The catch element in the catches of which the pawl engages can thus move relative to the pawl in the freewheeling direction, while, on the other hand, movement of the catch element in the blocking direction is prevented by the pawl. The limit value detection device according to the invention further comprises an actuating device configured to actuate the first catch element or the pawl so that the first catch element moves relative to the pawl in a catch-by-catch manner in the freewheeling direction. According to the invention, this relative movement takes place in a catch-by-catch manner, i.e. the first catch element and the pawl are moved on by exactly one catch with each deflection of the actuating device. In other words, the first catch element and the pawl are moved relative to each other with each deflection of the actuating device such that the first catch element moves on relative to the pawl step-by-step by one catch per actuation. If it is determined that the limit value has been exceeded or fallen below, the actuating device moves the first catch element relative to the pawl by one catch. Subsequently, the actuating device can return to its starting position. Thus, the occurrence of a limit value event can be detected multiple times. The actuating device can react sensitively to the variable to be measured for the purpose of limit value detection. This means that the actuating device can be deflected, for example, in response to a force, a temperature, a pressure, an electric current, and the like such that it actuates the first catch element or the pawl and moves these relative to each other by one catch if a predefined threshold value of the variable to be measured is fallen below or exceeded. According to the invention, the two or more catch elements of the catch mechanism together form a counting unit, wherein the number of limit value events to be detected is determined on the basis of the position or positioning of the respective catch elements relative to each other. This substantially corresponds to a coding of the number of limit value events to be detected by means of the catch elements. Here, all catch elements involved can be considered for determining the number of limit value events which have occurred. The respective positionings or positions of the individual catch elements together always define a one-to-one combination in the sense of coding. The number of possible one-to-one positioning combinations is determined, among other things, by the number of catches (e.g. teeth) of the respective catch elements. Particularly many possibilities result, for example, if, in the case of two catch elements involved, the number of catches (e.g. teeth) of the first catch element differs from the number of catches (e.g. teeth) of the second catch element, and they do not have a greatest common divisor.

According to the invention, the catch mechanism is manufactured using microstructuring technology and can be embodied, for example, as a microsystem or micromechanical or microelectromechanical system, for short MEMS. A microsystem differs significantly from precision-engineering structures in terms of structure and requirements to its production. While precision-engineering structures, e.g. gearwheels for clockworks, are usually punched or occasionally also lasered, microsystem structures are generally produced using etching processes. Many structures which can be produced using precision engineering can only be realized using microsystem technology with great difficulty or not at all. However, the production of the catch mechanism as a microsystem entails the decisive advantage that the catch mechanism becomes very compact and space-saving. In particular in comparison with the aforementioned precision-engineering structures, microsystem structures are frequently smaller by factors of several powers of ten.

BRIEF DESCRIPTION OF THE DRAWINGS

Embodiments of the invention will be detailed subsequently referring to the appended drawings, in which:

FIG. 2 shows a coding table for illustrating the counter status of the counter unit from FIG. 1 and FIG. 3, FIG. 5 shows a coding table for illustrating the counter status of the counter unit from FIG. 4A.

DETAILED DESCRIPTION OF THE INVENTION

Embodiments are described below, in which a counter unit is formed from a first catch element 103 and a second catch element 203. This serves merely for illustrating the general concept. It is also conceivable for more than two catch elements to be present, which then together form a counter unit. In the case of three or more catch elements, these multiple catch elements, for example in the sense of a parallel connection, can all come into engagement with the same catch element, for example with the first catch element 103. Alternatively or additionally, it would be conceivable for the multiple catch elements, in the sense of a series connection, to be all connected in series so that each catch element engages only precisely in one other catch element. A series connection of catch elements can in principle also be combined with a parallel connection of catch elements.

Furthermore, individual catch elements can be of annular configuration, wherein one or more further catch elements may be arranged inside and/or outside the annular catch element. The catch elements arranged inside, in the sense of a parallel connection, could all come into engagement with the annular catch element. Alternatively or additionally, the catch elements arranged inside, in the sense of a series connection, could all be connected in series. The same also applies to further catch elements arranged outside. It would also be conceivable for multiple annular catch elements to be arranged inside one another.

Embodiments in which the catch elements have an external toothing will be described below. Alternatively or additionally, these catch elements could also have an internal toothing. The same also applies the other way round.

In some embodiments, the first and the second catch element 103, 203 are each configured, purely by way of example, as gearwheels, wherein in this case the catches 102*a*, 102*b*, . . . , 102*n*; 220*a*, 220*b*, . . . , 220*m* are configured as teeth of the respective gearwheel 103, 203. In other embodiments, the first and the second catch element 103, 203 are each configured as gear racks, wherein in this case the catches 102*a*, 102*b*, . . . , 102*n*; 220*a*, 220*b*, . . . , 220*m* are configured as teeth of the respective gear rack 103, 203. Everything described in the following description while referring to gearwheels also applies in analogy to gear racks, and vice versa.

Figure 1:
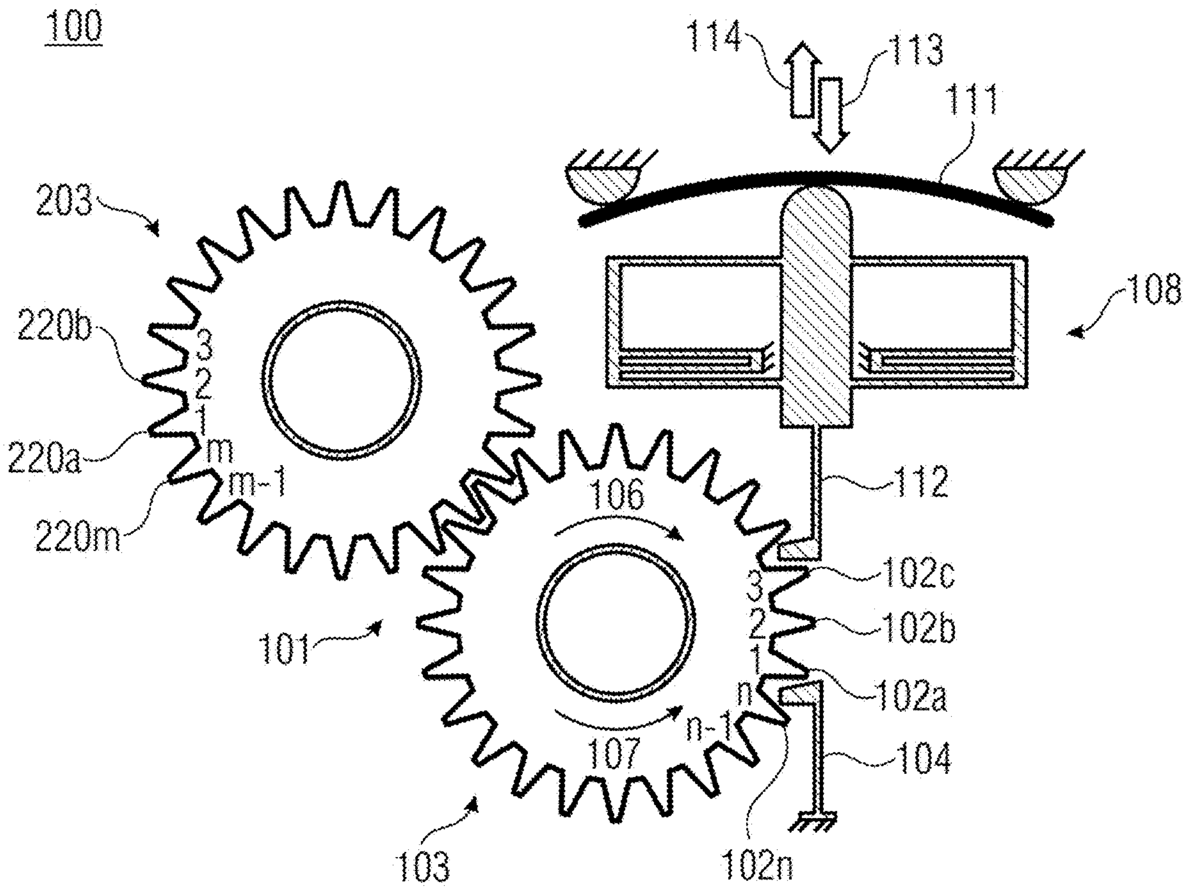
FIG. 1 shows a schematic view of an inventive limit value detection device according to a first embodiment.

FIG. 1 shows a first embodiment of an inventive limit value detection device 100. The limit value detection device 100 comprises a catch mechanism 101. In this example, the catch mechanism 101 comprises a first catch element 103 and a second catch element 203. However, it is also conceivable for the catch mechanism 101 to comprise more than the two catch elements 103, 203 shown here purely by way of example. In this case, of course, everything described herein while referring to the first and second catch elements 103, 203 also applies accordingly to every other catch element. The two or more catch elements may, in the sense of a series connection, be arranged such that each catch element engages in precisely one other catch element. Alternatively, the two or more catch elements may, in the sense of a parallel connection, be arranged such that the second and each further additional catch element engage in the first catch element. However, in order not to unnecessarily complicate the present description, only two catch elements will be described below purely by way of example.

In the embodiment shown here, the two catch elements 103, 203 are each implemented as a gearwheel with external toothing. However, it would also be conceivable for at least one of the two catch elements 103, 203 to be implemented with internal toothing or as a gear rack with multiple teeth.

The catch mechanism 101 can additionally comprise a pawl 104 which is functionally coupled to one of the catch elements 103, 203. The pawl 104 can, for example, engage in an intermediate space between two catches 102*a*, 102*b*, . . . , 102*n*; 220*a*, 220*b*, . . . , 220*m*. The pawl 104 can be configured such that it allows movement of the respective catch element 103, 203 in only one direction, while it inhibits movement in the respective opposite direction.

The first catch element 103 comprises a plurality n (at least two) of catches 102*a*, 102*b*, . . . , 102*n*, which are implemented here in the form of teeth. A catch intermediate space in which the pawl 104 can engage is formed between two adjacent catches each.

The second catch element 203 also comprises a plurality m (at least two) of catches 220*a*, 220*b*, . . . , 220*m*, which are implemented here in the form of teeth. In the embodiment shown here, the teeth or catches 102*a*, 102*b*, . . . , 102*n* of the first gearwheel or catch element 103 engage in the teeth or catches 220*a*, 220*b*, . . . , 220*m* of the second gearwheel or catch element 203.

The first catch element 103 is movable relative to the pawl 104 in a freewheeling direction 106. In a blocking direction 107, on the other hand, movement of the first catch element 103 can be blocked by means of the pawl 104. This can be realized, for example, by a suitable geometric shaping of the pawl 104 and the individual catches 102*a*, 102*b*, . . . , 102*n*.

The device 100 according to the invention additionally comprises an actuating device 108. The actuating device 108 is configured to move the first catch element 103 and the pawl 104 relative to each other in a catch-by-catch manner in the freewheeling direction 106. This means that the actuating device 108 can actuate either the first catch element 103 or the pawl 104 in order to move the first catch element 103 relative to the pawl 104 in a catch-by-catch manner.

In the embodiment shown in FIG. 1, the actuating device 108 actuates the first catch element 103. For this purpose, the actuating device 108 may comprise a thermal bending transducer 111. The thermal bending transducer 111 may, for example, be a bimetallic strip with different coefficients of thermal expansion. The thermal bending transducer 111 may also comprise a so-called bimorph. While the bimetallic strip comprises two metals with different coefficients of expansion, the bimorph generally comprises two different materials. For example, the bimorph may comprise a first active region comprising metal and a second active region comprising silicon.

The thermal bending transducer 111 may, for example, comprise an active region which is thermally deformable. The thermal bending transducer 111 is advantageously deflectable in a first direction 113 as a result of temperature. After cooling, the thermal bending transducer 111 returns to its original shape. The thermal bending transducer 111 may also comprise a shape memory alloy (SMA).

The actuating device 108 may advantageously be configured such that it is deflected in a first direction 113 when a predefined limit value is exceeded and/or fallen below in order to move the first catch element 103 in a catch-by-catch manner in the freewheeling direction 106 by means of this deflection.

In the embodiment shown here, the actuating device 108 comprises an actuating element 112 which can engage in a catch intermediate space between two adjacent catches 102*a*, 102*b*, . . . , 102*n* of the first catch element 103. The actuating element 112 may, for example, comprise a pawl-like shape configured to engage between two adjacent catches 102*a*, 102*b*, . . . , 102*n* of the first catch element 103.

The actuating element 112 can additionally be coupled to the thermal bending transducer 111 such that the actuating element 112 moves together with the thermal bending transducer 111 when the latter is deflected. For example, the thermal bending transducer 111 may deform in a first direction 113 when a temperature limit value is exceeded (alternatively: when it is fallen below) and the actuating element 112 may likewise move in this first direction 113. The actuating element 112 latched between two adjacent catches 102*a*, 102*b*, . . . , 102*n* thereby moves the first catch element 103 in the freewheeling direction 106. The pawl 104 unlatches, the first catch element 103 rotates further by one catch, and the pawl 104 latches in the following catch intermediate space. In this embodiment, the first gearwheel 103 would thus rotate by exactly one tooth in the freewheeling direction 106.

If the temperature has then fallen below the temperature limit value again (alternatively: has risen above the temperature limit value), the thermal bending transducer 111 returns to its original shape again and moves in a second direction 114, which is opposite to the first direction 113. As a result, the actuating element 112 also moves in this second direction 114 and in this case latches from the previous catch intermediate space into the next catch intermediate space. Subsequently, a new limit value detection can be carried out.

According to the invention, the catch elements of the catch mechanism 101 (here: the first catch element 103 and the second catch element 203) together form a counting unit, in which the counter status for indicating the detected limit value events is determined on the basis of the position or positioning of the individual catch elements 103, 203 relative to each other. In order to illustrate this, in FIG. 1 the catches 102*a*, 102*b*, . . . , 102*n* or teeth of the first catch element or gearwheel 103 are characterized by the numbers 1, 2, 3, . . . , n−1, n. The catches 220*a*, 220*b*, . . . , 220*m* or teeth of the second catch element or gearwheel 203 are characterized by the numbers 1, 2, 3, . . . , m−1, m.

In this embodiment, the catches or teeth 102*a*, 102*b*, . . . , 102*n* of the first catch element or gearwheel 103 engage in the catches or teeth 220*a*, 220*b*, . . . , 220*m* of the second catch element or gearwheel 203. Thus, during rotation of the first gearwheel 103, the second gearwheel 203 also rotates continuously. This results in a plurality of one-to-one positionings or positions of the catch elements 103, 203 relative to each other.

This is of advantage in particular when the catch elements or gearwheels 103, 203 of the catch mechanism all comprise a different number of catches or teeth. Thus, for example, with each catch-by-catch movement of the first catch element or gearwheel 103, one and the same tooth (e.g. tooth no. 2) of the one gearwheel 103, 203 can engage in different catch intermediate spaces or tooth gaps (e.g. in tooth gap 8/9 between tooth 8 and 9 and additionally also in tooth gap 20/21 between tooth 20 and 21) of the respective other gearwheel 103, 203. This results in different but individual combinations of positions of the individual catch elements or gearwheels 103, 203 relative to each other. This means that even if the smaller (i.e. the one comprising fewer teeth) of the two gearwheels 103, 203 rotates multiple times by 360°, one and the same tooth of the smaller gearwheel 103, 203 can engage after each full rotation in a respective other tooth gap of the larger (i.e. the one comprising more teeth) gearwheel 103, 203 so that despite multiple 360° rotations of the smaller gearwheel, different one-to-one combinations of positionings or positions of the engaging teeth of the two gearwheels 103, 203 occur.

In order to take up the above purely schematic example, for example, a first position of the gearwheels 103, 203 relative to each other in which tooth no. 2 of the first gearwheel 103 engages in the tooth gap 8/9 of the second gearwheel 203 can represent a first counter status, and a different second position of the two gearwheels 103, 203 relative to each other in which tooth no. 2 of the first gearwheel 103 engages in the tooth gap 20/21 of the second gearwheel 203 can represent a different second counter status. This means that different positionings or positions of the two catch elements 103, 203 relative to each other represent different counter statuses of the counting unit.

The counter unit formed from the individual catch elements of the catch mechanism 101 (here: from the first and second catch elements or gearwheels 103, 203) can indicate the counter status of the detected limit value events in the sense of a coding. The number of possible one-to-one positionings of the individual gearwheels 103, 203 relative to each other determines the number of available code words. This will be explained in more detail below with reference to the table shown in FIG. 2.

The table in FIG. 2 shows the possible different combinations of positionings of two gearwheels relative to each other, wherein a first gearwheel Z1 has a number of teeth of z1 =3 teeth, and a second gearwheel Z2 has a number of teeth of z2=5 teeth. In this example, the first gearwheel Z1 would correspond to the first catch element 103 and the second gearwheel Z2 would correspond to the second catch element 203.

In the first column of the table, the counter statuses are indicated which can be represented by means of the one-to-one combinations of positions of the two gearwheels Z1, Z2 relative to each other before a repetition of possible position combinations occurs. The counter statuses represent the number of detected limit value events, e.g. the number of sterilization cycles performed (therefore, the counter status is denoted here exemplarily by "cycles").

In the second column of the table, teeth 1, 2 and 3 of the first gearwheel Z1 are listed. In the third column of the table, teeth 1 to 5 of the second gearwheel Z2 are listed.

In the fourth column of the table, the possible combinations of the teeth of the first gearwheel Z1 with the teeth of the second gearwheel Z2, and thus the different position combinations of the two gearwheels Z1, Z2 relative to each other, are indicated. The first digit represents the number of the tooth of the first gearwheel Z1, and the second digit separated by a dash represents the number of the tooth of the second gearwheel Z2.

It can be seen in the table that one and the same tooth (e.g. tooth no. 1) of the first gearwheel Z1, during multiple 360° rotations, can come into contact with different teeth of the second gearwheel Z2. Thus, for example, tooth no. 1 of the first gearwheel Z1 can come into contact with tooth no. 1 of the second gearwheel Z2 during a first 360° rotation (see code word 1-1 in line 1 of the table). In a second 360° rotation of the first gearwheel Z1, tooth no. 1 of the first gearwheel Z1 can come into contact with tooth no. 4 of the second gearwheel Z2 (see code word 1-4 in line 4 of the table). In a third 360° rotation of the first gearwheel Z1, tooth no. 1 of the first gearwheel Z1 can come into contact with tooth no. 2 of the second gearwheel Z2 (see code word 1-2 in line 7 of the table). In a fourth 360° rotation of the first gearwheel Z1, tooth no. 1 of the first gearwheel Z1 can come into contact with tooth no. 5 of the second gearwheel Z2 (see code word 1-5 in line 10 of the table). In a fifth 360° rotation of the first gearwheel Z1, tooth no. 1 of the first gearwheel Z1 can come into contact with tooth no. 3 of the second gearwheel Z2 (see code word 1-3 in line 13 of the table). In a sixth 360° rotation of the first gearwheel Z1, the initial state is then reached again, i.e. here tooth no. 1 of the first gearwheel Z1 is then again in contact with tooth no. 1 of the second gearwheel Z2 (see code word 1-1 in line 16 of the table). From this point, the coding is repeated.

The number of limit value events to be detected is thus coded with a code which results from the different combinations of tooth positionings, or from the different combinations of positions of the two gearwheels 103, 203 relative to each other. Here, each individual numerical code or each code word, i.e. each different engagement position of the teeth of the first gearwheel Z1 with the teeth of the second gearwheel Z2, corresponds to a different positioning or position of the two gearwheels Z1, Z2 relative to each other. In other words, the first catch element or gearwheel 103 and the second catch element or gearwheel 203 together form a counting unit in which the number of limit value events to be detected is determined on the basis of possible different positions or positionings of the two catch elements 103, 203 relative to each other.

The coding table shown in FIG. 2 has been described merely purely exemplarily on the basis of a first gearwheel Z1 with z1=3 teeth and a second gearwheel Z2 with z2=5 teeth. It is of course conceivable for the two gearwheels to have totally different numbers of teeth. Accordingly, other combination possibilities also result from this. In addition, it would be conceivable for more than two gearwheels to be used for coding.

This coding is particularly suitable in particular when the individual gearwheels Z1, Z2 have a different number of teeth. The number of possible combinations can be maximized if the numbers of teeth of the individual gearwheels Z1, Z2 do not have a greatest common divisor (GCD). In this case, the maximum number of code words or combinations would be possible, which is calculated from a multiplication of the numbers of teeth of the individual gearwheels Z1, Z2 (e.g. according to: z1*z2). In the example from FIG. 2, **3*5**=15 different one-to-one position combinations of the two gearwheels Z1, Z2 relative to each other are possible. This means that although the two gearwheels Z1, Z2 have only three and five teeth, 15 different positionings can thus be realized, and thus 15 different counter statuses for counting limit value events can be realized.

If the numbers of teeth of the two gearwheels Z1, Z2 should have a greatest common divisor (GCD), the number of possible one-to-one combinations is calculated according to the following specification: z1/GCD*z2. Thus, for example, if the first gearwheel Z1 has six instead of the five teeth indicated above, the greatest common divisor would be the number 3, and accordingly, instead of the previously mentioned 15 one-to-one position combinations, only six one-to-one position combinations would be possible, and this even though the first gearwheel Z1 has one more tooth here.

In general, the start or initial positioning of the individual catch elements or gearwheels 103, 203 (e.g. code word 1-1 in line 1 of the table) represents the count "0". Thus, for example, a sterilization cycle counter in the start position (code word 1-1) would not yet have passed through a sterilization process. This is indicated by the counter status "0" in line 1 of the table. In the first sterilization process, the counter then moves to the value "1", which is indicated by the counter status "1" in line 2 of the table. This means that exactly one of all possible position combinations of the gearwheels 103, 203 is reserved for the start position. Remaining in the above example, in the case of 15 possible one-to-one position combinations, one would thus arrive at 14 countable sterilization cycles plus one position combination for the start position of the two gearwheels 103, 203 with counter status "0". This means that the countable limit value events (e.g. sterilization cycles) are calculated according to:

(Number of possible one-to-one position combinations)−1

Using the counting unit formed from the individual catch elements of the catch mechanism 101 (here: from the first and second gearwheels 103, 203), (z1*z2)−1 different counter statuses for counting limit value events can be realized if the numbers of teeth of both gearwheels 102, 203 do not have a greatest common divisor (GCD). If there were a GCD, the number of possible one-to-one counter statuses would be calculated according to:

$$\left(\frac{z1 * z2}{GCD}\right) - 1.$$

Generally, the gearwheel with the smaller number of teeth has a smaller diameter than the gearwheel with the larger number of teeth. Embodiments of the invention provide that, in the case of different numbers of teeth, the first catch element or gearwheel 103 has fewer teeth than the second catch element or gearwheel 203. Thus, the first gearwheel 103 would have a smaller diameter than the second gearwheel 203. This has the advantage that a gear reduction is thereby realized, wherein a smaller torque is used to rotate the smaller first gearwheel 103. This plays a role not to be neglected, in particular in the components of the inventive limit value detection device 100 manufactured using microstructuring technology.

Figure 3:
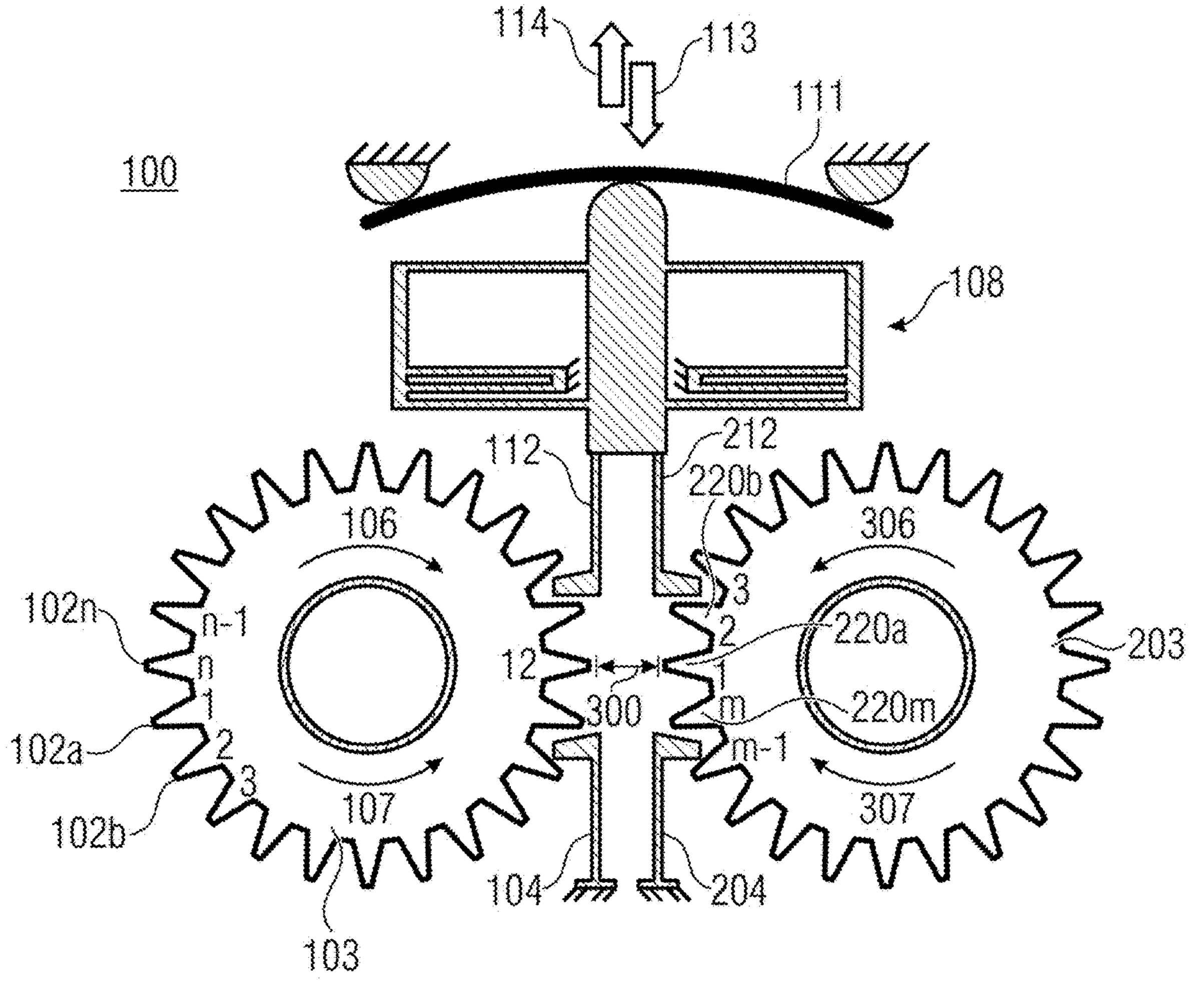
FIG. 3 shows a schematic view of an inventive limit value detection device according to a further embodiment.

FIG. 3 shows a further conceivable embodiment of an inventive limit value detection device 100. Identical parts having the same function as explained above with reference to FIG. 1 are provided with the same reference numerals. For a description in this regard, reference is made to FIG. 1.

The embodiment shown in FIG. 3 differs from the embodiment illustrated in FIG. 1, among other things, in that the second catch element or gearwheel 203 is arranged at a distance from the first catch element or gearwheel 103, and the catches or teeth 102*a*, 102*b*, . . . , 102*n*; 220*a*, 220*b*, . . . , 220*m* of the two catch elements 103, 203 do not engage in one another. As shown in FIG. 3, the two catch elements 103, 203 can be arranged next to each other.

Here, it would also be conceivable for the catch mechanism 101 to comprise more than the two catch elements 103, 203 shown here purely exemplarily. For example, one or more further catch elements could interact with the first catch element 103, and/or one or more further catch elements could interact with the second catch element 203.

In addition to the pawl 104 described above, a second pawl 204 is provided here which can engage in a catch intermediate space or a tooth gap between two adjacent catches or teeth 220*a*, 220*b*, . . . , 220*m* of the second catch element or gearwheel 203. The second pawl 204 allows movement or rotation of the second catch element or gearwheel 203 in a freewheeling direction 306, and blocks movement or rotation of the second catch element or gearwheel 203 in an opposite blocking direction 307.

The actuating device 108 comprises a second actuating element 212 which can engage in a catch intermediate space or in a tooth gap between two adjacent catches or teeth 220*a*, 220*b*, . . . , 220*m* of the second catch element or gearwheel 203. The second actuating element 212 may, for example, comprise a pawl-like shape configured to engage between the two adjacent catches 220*a*, 220*b*, . . . , 220*m* of the second catch element 203.

The actuating device 108 may advantageously be configured such that it is deflected in a first direction 113 when a predefined limit value is exceeded and/or fallen below in order to also move the second catch element 203 in a catch-by-catch manner in the freewheeling direction 106, 306 by means of this deflection, in addition to the first catch element 103.

For this purpose, the second actuating element 212 may be coupled to the thermal bending transducer 111 such that the second actuating element 212 moves together with the thermal bending transducer 111 when the latter is deflected. For example, the thermal bending transducer 111 may deform in a first direction 113 when a temperature limit value is exceeded (alternatively: when it is fallen below) and the second actuating element 212 may likewise move in this first direction 113. The second actuating element 212 latched between two adjacent catches 220*a*, 220*b*, . . . , 220*m* thereby moves the second catch element 203 in the freewheeling direction 306. The second pawl 204 unlatches, the second catch element 203 rotates by exactly one catch, and the second pawl 204 latches in the following catch intermediate space. In this embodiment, the second gearwheel 203 would thus rotate further in the freewheeling direction 306 by exactly one tooth.

If the temperature has then fallen below the temperature limit value again (alternatively: has risen above the temperature limit value), the thermal bending transducer 111 returns to its original shape again and moves in a second direction 114, which is opposite to the first direction 113. As a result, the second actuating element 212 also moves in this second direction 114 and in this case latches from the previous catch intermediate space into the next catch intermediate space. Subsequently, a new limit value detection can be carried out.

In this embodiment, different one-to-one combinations of positions or positionings of the individual catch elements or gearwheels 103, 203 relative to each other also occur. These different positions each represent the counter status of the counter unit formed by the individual catch elements of the catch mechanism 101 (here: by the first and second catch elements or gearwheels 103, 203).

The coding according to the table shown in FIG. 2 also substantially applies here. One difference is merely that the teeth of the respective gearwheels 103, 203 do not engage in one another. However, the different one-to-one positions of the gearwheels 103, 203 relative to each other are decisive and common to both embodiments.

For all embodiments described herein, a marking 300 could be present, for example, on, next to or between the gearwheels 103, 203 where it can be read which tooth of the respective gearwheel 103, 103, 203 is currently at this marking 300. The respective positioning or position of the respective catch element or gearwheel 103, 203 can be determined at this marking 300. A single marking 300 is shown purely exemplarily in FIG. 3. However, a separate marking may also be provided for each catch element 103, 203.

In the example shown in FIG. 3, tooth no. 12 of the first catch element or gearwheel 103 and tooth no. 1 of the second catch element or gearwheel 203 would be opposite each other at the marking 300, for example. This would correspond to a code word 12-1, which in turn would correspond to a specific counter status of the counter unit.

Figure 4A:
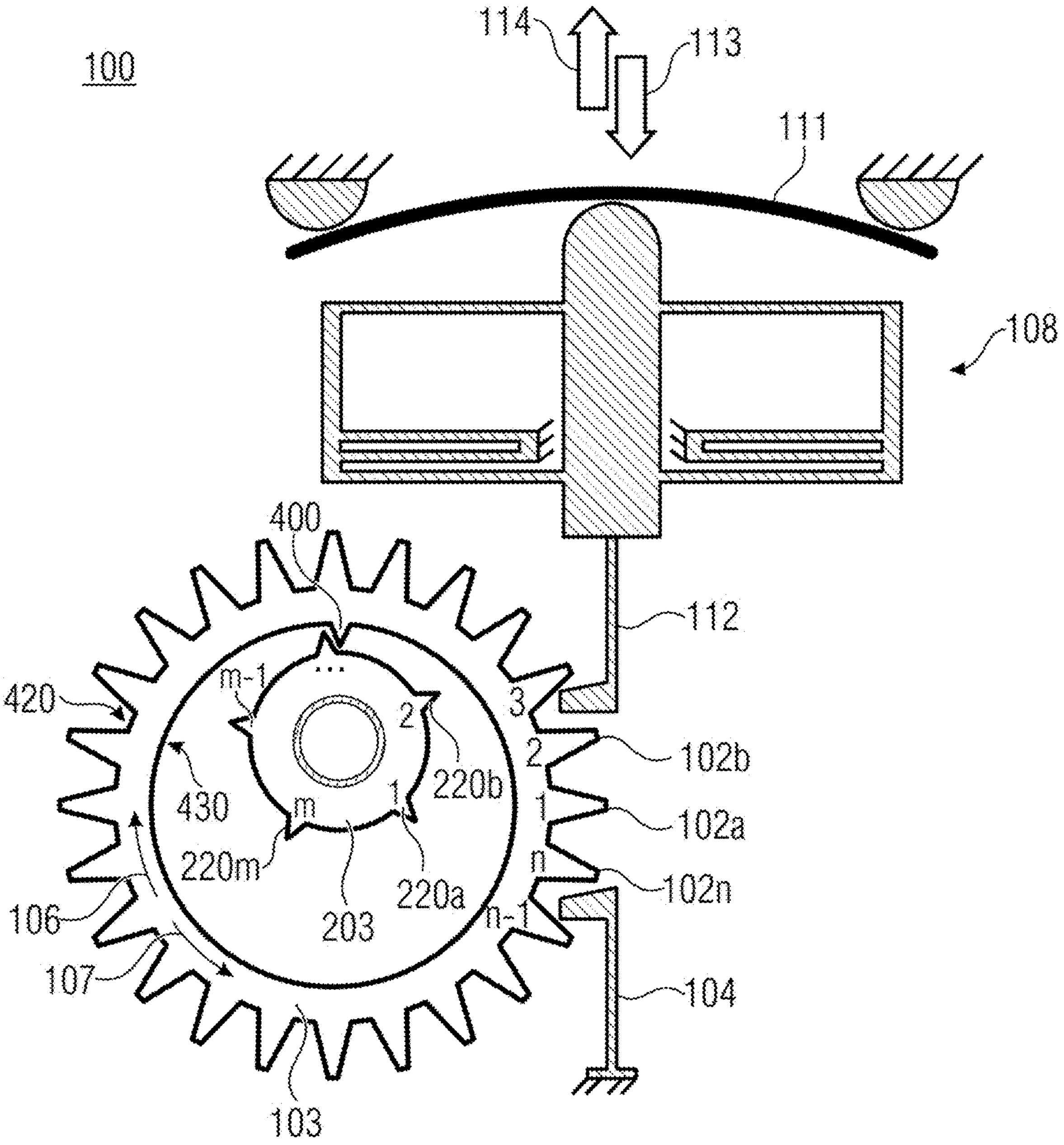
FIG. 4A shows a schematic view of an inventive limit value detection device according to a further embodiment.

FIG. 4A shows a further embodiment of an inventive limit value detection device 100. Equal parts having the same function as explained above with reference to FIGS. 1 and 3 are provided with equal reference numerals. For a description in this regard, reference is made to these figures.

In the previously discussed embodiments according to FIGS. 1 and 3, the second catch element or gearwheel 203 moves or rotates continuously with the first catch element or gearwheel 103, i.e. each time the first catch element or gearwheel 103 rotates further by one catch, the second catch element or gearwheel 203 also rotates further by one catch. The second catch element or gearwheel 203 thus moves continuously with the first catch element or gearwheel 103. This can be realized by an engagement of the teeth of the two gearwheels 103, 203 (FIG. 1), or alternatively (FIG. 3) in that the actuating device 108 moves or rotates both gearwheels 103, 203 together by one catch or one tooth with an actuating operation.

The embodiment shown in FIG. 4A differs from the previously discussed embodiments, among other things, in that the second catch element or gearwheel 203 moves discontinuously from the first catch element or gearwheel 103. This is to mean that the second catch element or gearwheel 203 does not move or rotate in a catch-by-catch manner during each catch-by-catch movement or rotation of the first catch element or gearwheel 103. Instead, the second catch element or gearwheel 203 rotates by one catch only during every nth catch-by-catch movement or rotation of the first catch element or gearwheel 103, wherein n>1.

In the example shown in FIG. 4A, the second catch element or gearwheel 203 moves or rotates by one catch or one tooth only during each full rotation (by 360°) of the first catch element or gearwheel 103. This means that the first catch element or gearwheel 103 first rotates completely by all its catches or teeth 102*a*, 102*b*, . . . , 102*n* before the second catch element or gearwheel 203 moves or rotates by a single catch or a single tooth 220*a*, 220*b*, . . . , 220*m*.

For this purpose, the first catch element or gearwheel 103 can comprise a drive (or dog) element 400. In the exemplary embodiment shown here, the first gearwheel 103 comprises an annular structure, i.e. the toothing with the teeth 102*a*, 102*b*, . . . , 102*n* is arranged radially on the outside on the outer circumference 420 of the first gearwheel 103. In this exemplary embodiment, the drive element 400 is arranged on the inner circumference 430 of the annular first gearwheel 103.

According to such an embodiment, the first catch element or gearwheel 103 can thus be of annular configuration, wherein the catches or teeth 102*a*, 102*b*, . . . , 102*n* are arranged in the form of external toothing on the outer circumference 420 of the annular first catch element or gearwheel 103. The annular first catch element or gearwheel 103 may also comprise a drive element 400 which is arranged on the inner circumference 430 of the annular first catch element or gearwheel 103.

As illustrated exemplarily in FIG. 4A, the second catch element or gearwheel 203 can be arranged inside the annular first catch element or gearwheel 103. In this case, the outer diameter (including the teeth 220*a*, 220*b*, . . . , 220*m*) of the second catch element or gearwheel 203 would be smaller than the inner diameter of the annular first catch element or gearwheel 103 (without the drive element 400).

The teeth 220*a*, 220*b*, . . . , 220*m* of the second catch element or gearwheel 203 can be implemented in the form of external toothing on the outer circumference of the second catch element or gearwheel 203. Thus, the teeth 220*a*, 220*b*, . . . , 220*m* of the external toothing of the second catch element or gearwheel 203 are opposite the drive element 400 which is arranged on the inner circumference 420 of the annular first catch element or gearwheel 103.

The drive element 400 may come into engagement with the teeth 220*a*, 220*b*, . . . , 220*m* of the external toothing of the second catch element or gearwheel 203. As a result, the drive element 400 rotates the second catch element or gearwheel 203 in a catch-by-catch manner, i.e. by exactly one catch or exactly one tooth.

Alternatively or additionally to the embodiment shown in FIG. 4A, it would be conceivable for the second catch element or gearwheel 203, or at least one further catch element, to be arranged outside the first catch element 103. In this case, the drive element 400, or a further drive element, would also be arranged on the outer circumference 420 of the first catch element 103. Here, the drive element would move the externally arranged catch element discontinuously (e.g. after each full 360° rotation of the first catch element 103) by one catch.

Suitably, the first catch element or gearwheel 103 comprises exactly one drive element 400 on the inner circumference 430 and/or on the outer circumference 420. Thus, the first catch element or gearwheel 103 can rotate by full 360° before the drive element 400 then moves the second catch element or gearwheel 203 by exactly one catch or one tooth. In other words, the second catch element or gearwheel 203 is rotated by one catch or one tooth only after each full 360° rotation of the first catch element or gearwheel 103.

If the first catch element or gearwheel 103 comprises exactly one single drive element 400, first all the teeth 102*a*, 102*b*, . . . , 102*n* of the external toothing of the first catch element or gearwheel 103 can be passed through completely and used for counting the detected limit value events (e.g. temperature threshold value exceeded), while the second catch element or gearwheel 203 is always in the same position.

Only after a complete pass of all the teeth 102*a*, 102*b*, . . . , 102*n* of the external toothing of the first catch element or gearwheel 103, i.e. after a full 360° rotation of the first catch element or gearwheel 103, is the second catch element or gearwheel 203 rotated by exactly one catch or one tooth by means of the drive element 400 and thereby assumes a new second position. In this second position of the second catch element or gearwheel 203, the first catch element or gearwheel 103 can then again pass through all the teeth 102*a*, 102*b*, . . . , 102*n* of the external toothing, i.e. complete a new 360° rotation.

Here, it would also be conceivable for the catch mechanism 101 to comprise more than the two catch elements 103, 203 shown purely exemplarily. Here, it would be conceivable in particular for further catch elements to be provided which have the same function and the same features as the second catch element 203 described here exemplarily. The one or more additional catch elements could be arranged inside the first catch element 103, as was described using the example of the second catch element 203. Alternatively or additionally, the one or more additional catch elements could be arranged outside the first catch element 103.

Since the counter unit according to the invention is always formed from the individual catch elements of the catch mechanism 101 (here: from the first catch element or gearwheel 103 and the second catch element or gearwheel 203), the individual catch elements or gearwheels 103, 203 are used for counting the detected limit value events. Here, too, a plurality of possible one-to-one positionings of the individual gearwheels 103, 203 relative to one another result which can represent the counter status in the sense of a coding. This will be explained in somewhat more detail below on the basis of the table shown in FIG. 5.

The table in FIG. 5 exemplarily shows possible different combinations of positionings of two gearwheels relative to each other, as were described in the embodiment from FIG. 4A. Here, the first catch element or gearwheel 103 comprises a drive element 400. After each full 360° rotation of the first catch element or gearwheel 103, the drive element 400 actuates the second catch element or gearwheel 203 and moves or rotates it by one catch or one tooth.

In the table, two gearwheels Z1, Z2 with different numbers of teeth are listed. A first gearwheel Z1 has a number of teeth of z1=3 teeth, and a second gearwheel Z2 has a number of teeth of z2=5 teeth. Here, the first gearwheel Z1 would correspond to the second catch element 203 and the second gearwheel Z2 would correspond to the first catch element 103.

In the first column of the table, the counter statuses are indicated which are possible by means of the one-to-one combinations of positions of the two gearwheels Z1, Z2 relative to each other before a repetition of possible position combinations occurs. With regard to further explanations of the counter statuses, reference is made to the description of the table shown in FIG. 2.

In the second column of the table, teeth no. 1, no. 2 and no. 3 of the first gearwheel Z1 are listed. In the third column of the table, teeth no. 1 to 5 of the second gearwheel Z2 are listed.

In the fourth column of the table, the possible combinations of the teeth of the first gearwheel Z1 with the teeth of the second gearwheel Z2, and thus the resulting code words, are indicated which describe the different position combinations of the two gearwheels Z1, Z2 relative to each other. The first digit represents the number of the tooth of the first gearwheel Z1, and the second digit separated by a dash represents the number of the tooth of the second gearwheel Z2.

As explained above with reference to FIG. 4A, the first catch element or gearwheel 103 (here: Z2) rotates by full 360° while the second catch element or gearwheel 203 (here: Z1) remains in one and the same positioning or position during this time.

In the table, this can be seen from the fact that the gearwheel Z2 rotates over all five teeth (which corresponds to a full 360° rotation) while the gearwheel Z1 remains in the first tooth position during this time. This can be seen in the first five lines of the table in which the gearwheel Z1 always remains at position or tooth position no. 1 while the gearwheel Z2 assumes tooth positions no. 1 to 5. Accordingly, this results in the number codes 1-1, 1-2, 1-3, 1-4 and 1-5.

After a full 360° rotation, i.e. when the first tooth of the gearwheel Z2 has reached the start position again (line 6), the gearwheel Z1 is rotated by one tooth by means of the drive element 400 of the gearwheel Z2, i.e. the gearwheel Z1 is then in the second tooth position. This is illustrated on the basis of digit 2 in the column "Z1" and lines 6-10 of the table. While the gearwheel Z1 remains in this second tooth position, the gearwheel Z2 rotates again by all five teeth, i.e. by 360°. This is illustrated on the basis of digits 1 to 5 in the column "Z2" and lines 6-10 of the table. Accordingly, this results in the number codes 2-1, 2-2, 2-3, 2-4 and 2-5.

After a further full 360° rotation, i.e. when the first tooth of the gearwheel Z2 has reached the start position again (line 11), the gearwheel Z1 is rotated again by one tooth by means of the drive element 400 of the gearwheel Z2, i.e. the gearwheel Z1 is then in the third tooth position. This is illustrated on the basis of digit 3 in the column "Z1" and lines 11-15 of the table. While the gearwheel Z1 remains in this third tooth position, the gearwheel Z2 rotates again by all five teeth, i.e. by 360°. This is illustrated on the basis of digits 1 to 5 in the column "Z2" and lines 11-15 of the table. Accordingly, this results in the number codes 3-1, 3-2, 3-3, 3-4 and 3-5.

The number of limit value events to be detected is thus coded with a code which results from the different combinations of different positionings or positions of the individual gearwheels Z1, Z2 relative to each other. Here, each position corresponds to exactly one numerical code or code word. In other words, the individual catch elements of the catch mechanism 101 (here: the first catch element or gearwheel 103 and the second catch element or gearwheel 203) together form a counting unit in which the number of limit value events to be detected is determined on the basis of possible different positions or positionings of the individual catch elements 103, 203 relative to each other.

The coding table shown in FIG. 5 has been described merely purely exemplarily on the basis of a gearwheel Z1 with z1=3 teeth and a gearwheel Z2 with z2=5 teeth. It is of course conceivable for the two gearwheels Z1, Z2 to have totally different numbers of teeth. Accordingly, other combination possibilities also result from this. It would also be conceivable for more than two catch elements or gearwheels to be provided.

The number of possible combinations, i.e. the maximum possible number of one-to-one code words or combinations, is calculated from a multiplication of the numbers of teeth of the individual gearwheels (e.g. according to: z1*z2). In the example from FIG. 5, 3*5=15 different or one-to-one position combinations of the two gearwheels Z1, Z2 relative to each other are thus possible.

This means that although the two gearwheels Z1, Z2 have only three and five teeth, 15 different positionings can thus be realized, and thus 15 different counter statuses for counting limit value events can also be realized.

It is also conceivable for the first catch element or gearwheel 103 to comprise more than the single drive element 400 shown here exemplarily. It would also be conceivable for additional catch elements or gearwheels to be present in addition to the second catch element or gearwheel 203, which could be moved in a catch-by-catch manner by means of the drive element 400 (or multiple drive elements). It would also be conceivable for additional catch elements or gearwheels to be present in addition to the second catch element or gearwheel 203, the catches or teeth of which engage in the catches or teeth of the second catch element 203 and are moved on by the second catch element 203.

Alternatively or additionally to the embodiment shown in FIG. 4A, it would be conceivable for the drive element 400, or an additional drive element, to be mounted on the outer circumference 420 of the first catch element or gearwheel 103. Here, the drive element 400 could be arranged, for example, between two adjacent catches 102*a*, 102*b*. The drive element 400 could be longer than the catches 102*a*, 102*b*, . . . , 102*n* and thus protrude beyond the outer contour of the catches 102*a*, 102*b*, . . . , 102*n*. In this case, the second catch element or gearwheel 203 could be arranged at a distance from the first catch element or gearwheel 103 so that the catches or teeth 102*a*, 102*b*, . . . , 102*n* of the first catch element or gearwheel 103 do not come into engagement with the catches or teeth 220*a*, 220*b*, . . . , 220*m* of the second catch element or gearwheel 203. On the other hand, the protruding drive element 400 would then be able to engage in the catches or teeth 220*a*, 220*b*, . . . , 220*m* of the second catch element or gearwheel 203 in order to rotate the second catch element or gearwheel 203 by one catch or one tooth.

In the embodiment according to FIG. 4A, an end stop can also be realized, wherein the second catch element or gearwheel 203 entrained by means of the drive element 400 could hit the end stop after a complete 360° rotation. Thus, a maximum number of limit value events to be detected can be determined without an overflow occurring.

Figure 4B:
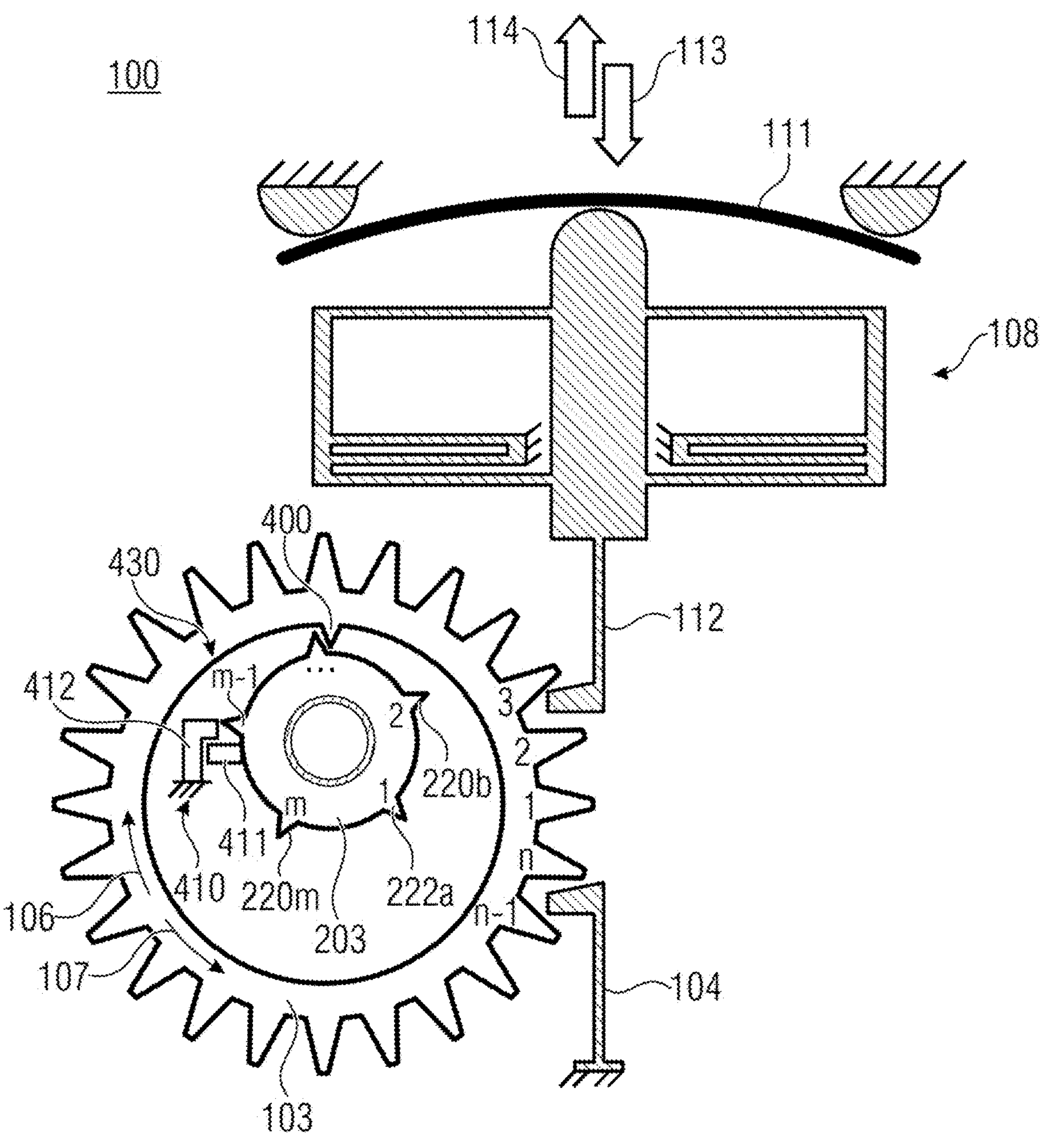
FIG. 4B shows a schematic view of an inventive limit value detection device according to a further embodiment.

FIG. 4B shows a corresponding conceivable embodiment of an inventive limit value detection device 100 with an end stop. Equal parts having the same function as explained above with reference to FIG. 4A are provided with the same reference numerals. For a description in this regard, reference is made to FIG. 4A. In the embodiment according to FIG. 4B, more than the two catch elements 103, 203 shown purely exemplarily can again also be provided. It would be conceivable in particular for further catch elements to be provided which have the same function and the same features as the second catch element 203 described here exemplarily. The one or more additional catch elements could be arranged inside the first catch element 103, as was described using the example of the second catch element 203. Alternatively or additionally, the one or more additional catch elements could be arranged outside the first catch element 103.

One difference to FIG. 4A is that the embodiment shown in FIG. 4B has an optional end stop 410. The end stop 410 is configured to prevent further rotation of the counter unit at a specific point. For example, the movement of the counter unit can be prevented if an overflow would otherwise occur, i.e. without the end stop 410. This would be the case, for example, exactly after all the tooth combinations or code words have been passed through exactly once. As a result, an overflow can be prevented, which is of advantage, for example, for the purpose of forgery protection and can counteract manipulation.

The end stop 410 may be configured as a mechanical end stop. The end stop 410 may comprise, for example, a first stop element 411 protruding from the outer circumference of the second catch element or gearwheel 203. This may, for example, be configured in the form of an additional catch element or tooth. This additional tooth 411 may be arranged in a catch intermediate space between two adjacent catches 220*a*, 220*b*, . . . , 220*m*.

The end stop 410 may also comprise a fixed second stop element 412. The second stop element 412 is arranged opposite the second catch element 203 such that the catches or teeth 220*a*, 220*b*, . . . , 220*m* of the second catch element 203 can run past the second stop element 412 during rotation in an unhindered manner.

The first stop element 411, on the other hand, can be of longer configuration than the remaining catches 220*a*, 220*b*, . . . , 220*m*, i.e. the first stop element 411 may protrude further from the outer circumference of the second catch element 203 than the remaining catches 220*a*, 220*b*, . . . , 220*m*. The first stop element 411 may protrude to such an extent that it does not run past the second stop element 412 in an unhindered manner but instead strikes the second stop element 412. As a result, further rotation of the second catch element 203 is prevented.

It is to be mentioned that FIG. 4B is merely a schematic view. The end stop 410 or its stop elements 411, 412 may also be arranged at a different position. In addition, the stop elements 411, 412 are arranged such that the drive element 400 can move past them in an unhindered manner. The first stop element 411 is also configured such that it does not touch the inner circumference 430 of the first catch element 103.

In the position shown purely exemplarily in FIG. 4B, exactly one full revolution of the first catch element 103 would still be possible before the end stop 410 prevents further movement of the two catch elements 103, 203.

Such an end stop 410 would also be conceivable in the embodiments discussed above with reference to FIGS. 1, 3 and 4. For example, one of the two catch elements 103, 203 shown there could be replaced by the embodiment shown in FIG. 4B. In this case, the inner small catch element from FIG. 4B could serve purely for the purpose of realizing the end stop 410, while the coding described herein is still effected by means of the two large catch elements 103, 203.

In all embodiments described herein, the movable parts of the microstructured limit value detection device 100 could move in a common plane. The movable parts include, among other things, the catch elements or gearwheels 103, 203 and the actuating device 108. For example, the limit value detection device 100 could be arranged on a substrate so that all movable parts move in the substrate plane, i.e. parallel to the substrate surface.

It would also be conceivable for the catch elements or gearwheels 103, 203 to have scales on the basis of which the teeth can be numbered and/or the counter statuses can be read. The scales may, for example, be mounted (e.g. printed, engraved or lasered in) on the catch elements or gearwheels 103, 203. With a numbering of the catches or teeth, it could be read, for example, which catches or teeth 102*a*, 102*b*, . . . , 102*n* of the first catch element or gearwheel 103 would be in engagement with which catches or teeth 220*a*, 220*b*, . . . , 220*m* of the second catch element or gearwheel 203 (FIG. 1), or which catches are opposite each other and/or which catches are at a marking (e.g. marking 300 in FIG. 3). In general, the positioning or position of the two catch elements or gearwheels 103, 203 relative to each other can thus be determined with a scale.

Alternatively or additionally, it would be conceivable for the counter statuses to be read, and possibly decoded, by means of suitable electronic components.

The position or positioning of the respective catch element or gearwheel 103, 203 can be determined, for example, by means of an electrical component (e.g. capacitor) which changes its electrical properties (e.g. capacitance) depending on the position of the respective catch element or gearwheel 103, 203.

Figure 6:
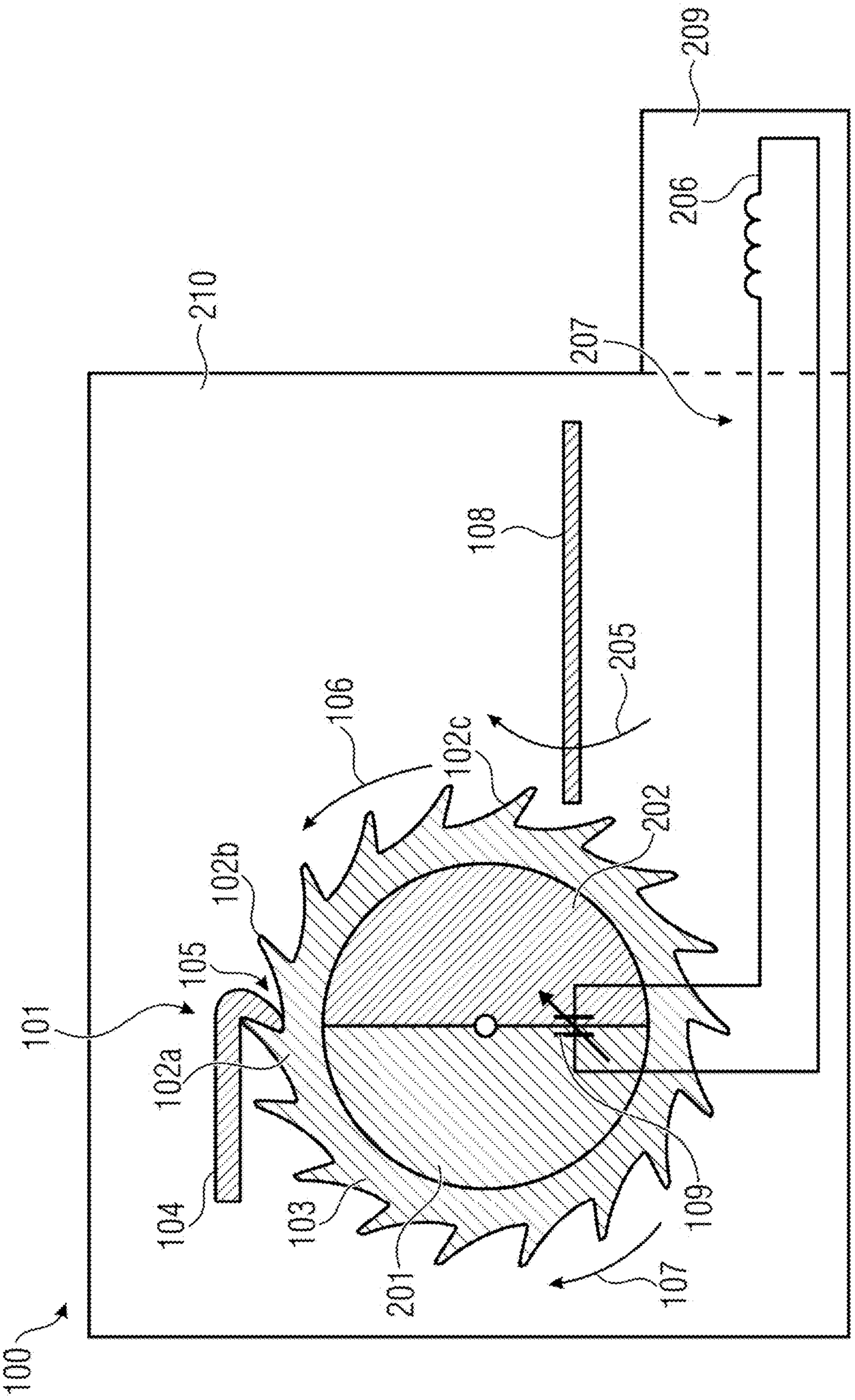
FIG. 6 shows a schematic view of a catch element with an electrical component for reading out the counter status of the counter unit according to embodiments.

In this regard, FIG. 6 shows a conceivable embodiment using the example of the first catch element or gearwheel 103, wherein this concept may also be transferred to the second catch element or gearwheel 203. In addition, equal parts having the same function as explained above with reference to FIGS. 1 to 5 are provided with the same reference numerals. For a description in this regard, reference is made to these figures.

The first catch element or gearwheel 103 is formed here as a freely rotatable gearwheel. However, it would also be conceivable for the first catch element or gearwheel 103 to be rotatable elastically, i.e. the gearwheel 103 could be rotatable against a spring force, for example. A spring (not shown here), such as a spiral spring known from clockworks, for example, could be coupled to the gearwheel 103 such that the spring is tensioned (i.e. tensioned either to pressure or to tension) when the gearwheel 103 is moved in a first direction, and the spring is relaxed when the gearwheel 103 is moved in a second direction opposite the first direction. This also applies to all embodiments discussed herein, as well as to the second catch element or gearwheel 203.

In the gearwheel 103 shown in FIG. 6, the pawl 104 engages in the tooth intermediate spaces between two adjacent teeth 102*a*, 102*b*. It can be seen that a freewheeling direction 106 in which the gearwheel 103 is freely rotatable relative to the pawl 104 also results here, due to the specific shape of the pawl 104 and the individual teeth 102*a*, 102*b*. However, in the opposite direction, i.e. in a blocking direction 107, the pawl 104 blocks the movement of the gearwheel 103.

In this embodiment, the actuating device 108 actuates the catch element 103 in order to move it by one catch 102*a*, 102*b* relative to the pawl 104 in a catch-by-catch manner in the freewheeling direction 106. As can be seen, the actuating device 108 engages on a catch 102*c* of the catch element 103 in order to move the catch element 103 relative to the pawl 104 in a catch-by-catch manner.

The inventive limit value detection device 100 is provided here on a substrate 210. The substrate 210 may, for example, be a silicon wafer. The inventive device 100 may be provided on the substrate 210 as a microsystem. For example, the illustrated gearwheel structure 103 can be produced by suitable etching methods.

As indicated by the arrow 205, the actuating device 108 is deflected upward in the image plane in order to actuate the gearwheel 103. The actuation means 108 is thus deflected in the horizontal direction, i.e. in a plane parallel to the substrate plane.

The movement of the actuating device 108 is substantially a pivoting movement caused by the supply of external energy (e.g. thermal energy), wherein the behavior of the actuating device 108 in this example is approximately comparable to that of a bending bar clamped on one side.

The use of the above-mentioned electrical component 109 for determining the actual position of the catch element 103 is not limited to the embodiment of the actuating device 108 shown in FIG. 6. Rather, the electrical component 109 can be used independently of the specific configuration of the actuating device 108, which is why the electrical component 109 can be combined with all embodiments described herein.

The electrical component 109 is configured here purely exemplarily as a capacitor. More precisely, a first capacitor plate 201 is provided here on the substrate 210 and a second capacitor plate 202 is provided on the catch element 103. It would also be conceivable for a first capacitor plate 201 to be arranged on the first catch element 103 and for a second capacitor plate 202 to be arranged on the second catch element 203 (not shown here).

As can be seen, the two capacitor plates 201, 202 are two semicircular segments. In the positioning of the gearwheel 103 relative to the substrate 210 shown in FIG. 6, the two capacitor plates 201, 202 are aligned relative to each other such that they are located precisely opposite each other, i.e. so that they join to form a complete circle in plan view.

Due to the positioning of the two capacitor plates 201, 202 relative to each other, the capacitor 109 has a specific capacitor capacitance in this position. During a catch-by-catch movement of the catch element 103 relative to the substrate 210, the gearwheel 103 rotates relative to the substrate 210 and thus the alignment of the two capacitor plates 201, 202 relative to each other also changes. At the same time, the capacitor capacitance of the capacitor 109 also changes. The electrical component 109 may be an adjustable member of an RFID resonant circuit 207. The RFID resonant circuit 207 may also have a coil 206 in addition to the capacitor 109. This is an LC resonant circuit with a component-dependent resonant frequency.

The resonant frequency of the resonant circuit 207 changes depending on the capacitor capacitance of the adjustable capacitor 109. Thus, a specific positioning of the two capacitor plates 201, 202 relative to each other results for each position of the gearwheel 103 relative to the substrate 210 or relative to the pawl 104. As a result, a specific capacitor capacitance and thus a specific resonant frequency of the RFID resonant circuit 207 is set for each actual position.

This means that the RFID resonant circuit 207 has a specific resonant frequency for each actual position of the gearwheel 103 relative to the substrate 210 or relative to the pawl 104. The RFID resonant circuit 207 can be read out by means of a suitable RFID reader. Here, the position of the gearwheel 103 (second capacitor plate 202) relative to the substrate 210 (first capacitor plate 201) or relative to the pawl 104 can thus be deduced from the respective characteristic transmission frequency of the resonant circuit 207. Likewise, the position of the first catch element 103 relative to the second catch element 203 could be deduced from the respective characteristic transmission frequency of the resonant circuit 207.

The device 100 may comprise an electronic interface 209 for this purpose. The electronic interface 209 makes it possible to read out the change of the electrical component 109, for example if the electrical component 109 directly represents the adjustable member of an RFID resonant circuit or a more complex electronic system.

If the electrical component 109 corresponds to a typical component (capacitor, coil, resistor) of a resonant circuit 207, e.g. a variable capacitor 109, and forms an LC resonant circuit 207 together with a coil structure 206, a change of the capacitance also changes the oscillation characteristic of the resonant circuit 207. The resulting passive transponder of an RFID (radio-frequency identification) system can be read out wirelessly with a corresponding reader. It is also conceivable for the electrical component 109 to be a coil and for the other resonant circuit element 206 to be a capacitor.

If the electrical component 109 is part of an electronic circuit, which in turn is part of an RFID transponder system, electrical energy can be coupled wirelessly into the circuit with the aid of a corresponding reader and can be used for carrying out functions of the electronic circuit, e.g. for signal amplifications, signal evaluations and further transmission tasks.

The electrical component 109 does not necessarily have to be a capacitor. It would likewise be conceivable for the electrical component 109 to be an ohmic resistor, a coil or an electro-optical element.

Figure 7:
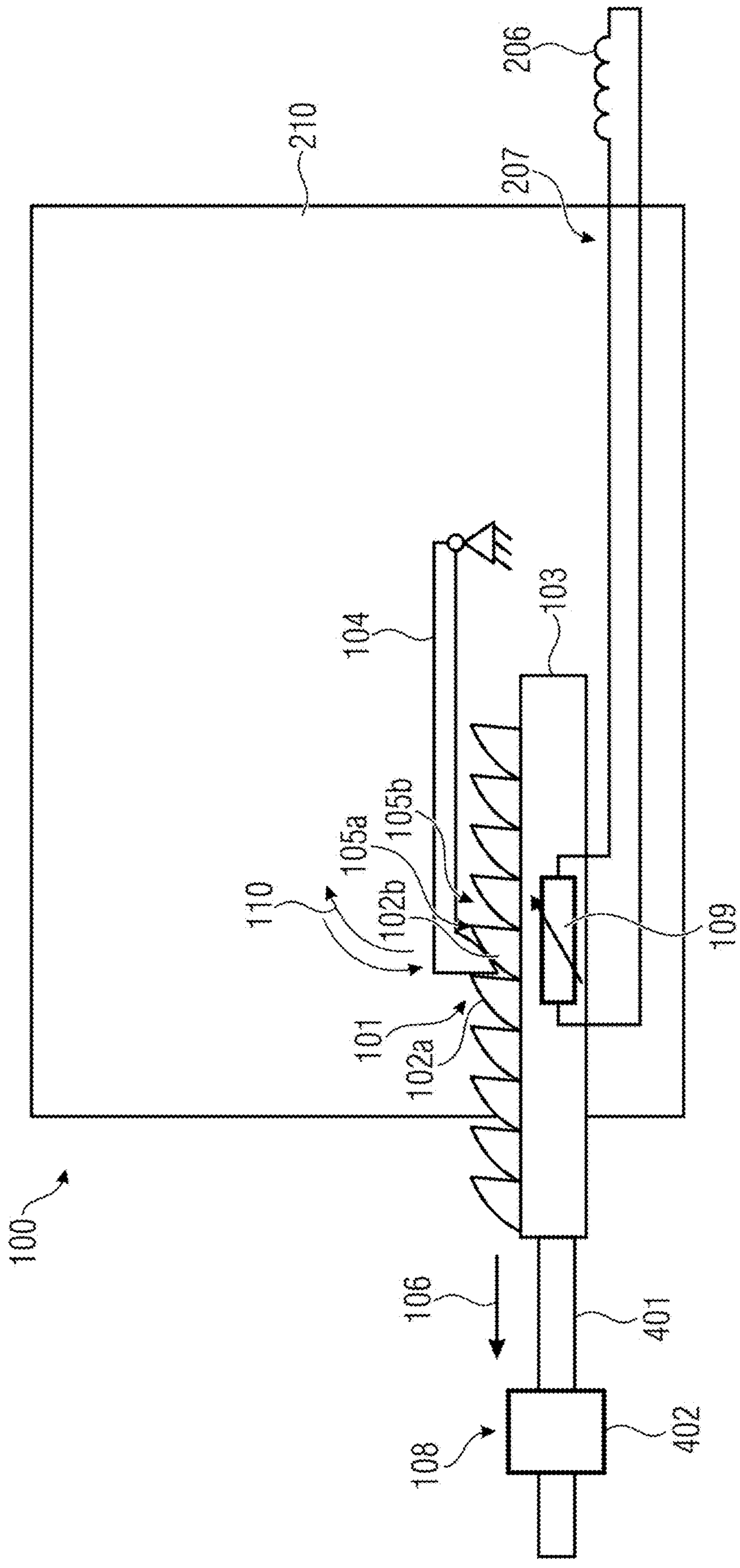
FIG. 7 shows a further schematic view of a catch element with an electrical component for reading out the counter status of the counter unit according to embodiments.

An embodiment in which an ohmic resistor could be used, for example, is shown in FIG. 7. Again, merely the first catch element 103 is shown purely exemplarily, representing both catch elements 103, 203. This means that everything described below while referring to the first catch element 103 also applies to the second catch element 203.

Here, the first catch element 103 is implemented in the form of a gear rack comprising multiple teeth 102*a*, 102*b*. The actuating device 108 is implemented in the form of a linear actuator which actuates the catch element 103. The actuating device 108 pulls or pushes the gear rack 103 in the freewheeling direction 106.

In each catch-by-catch movement of the gear rack 103 by means of the actuating device 108, the pawl 104 moves toward the gear rack 103 or away from the gear rack 103 along the directions shown by the arrows 110 in order to thus engage between the tooth intermediate spaces of two adjacent teeth 102*a*, 102*b*.

Although the catch element 103 is illustrated here as a linear gear rack. However, it is also conceivable for the gear rack 103 to be curved rather than linear. Thus, a gear rack 103 may, for example, also have a circular arc-shaped or circular segment-shaped structure, wherein the toothing may be arranged radially on the inside and/or radially on the outside.

Regardless of whether the catch element 103 is a gear rack or a gearwheel, the individual catches 102*a*, 102*b* are arranged one behind the other along the catch element 103 in the freewheeling direction 106 so that the pawl 104 engages in succession from one catch intermediate space 105*a* into the next adjacent catch intermediate space 105*b* in the catch-by-catch movement. As a result, for example, in the case of the endlessly rotating gearwheel 103, no separate resetting mechanism has to be provided.

The actuating device 108 may, for example, comprise traction means 401 and a traction device 402 which actuates the actuating device 108 by means of the traction means 401 and thus moves the gear rack 103. The actuating device 108 may, for example, be mechanically (also including thermally) or electrically deflectable.

The electrical component 109 may, as mentioned in the beginning, be a variable ohmic resistor. In the exemplary embodiment shown here, the resistor 109 may be arranged between the catch mechanism 101 and the substrate 210. The variable ohmic resistor 109 here is approximately comparable to a potentiometer. With each catch-by-catch movement of the catch element 103 relative to the pawl 104 or relative to the substrate 210, the electrical resistance thereof changes.

The ohmic resistor 109 may also be part of a resonant circuit 207. This is, for example, a detunable RL resonant circuit 207, which has the mentioned ohmic resistor 109 and a coil arrangement 206.

Also in this embodiment, instead of the ohmic resistor, a capacitor may also be used as a detunable electrical component 109 in order to form, together with the coil 206, a detunable LC resonant circuit 207 as described above with reference to FIG. 6.

As also mentioned above with reference to FIG. 6, the catch element 103 may be freely movable, or also elastically movable. Here, the gear rack 103 may be actuatable by a spring.

Figure 8:
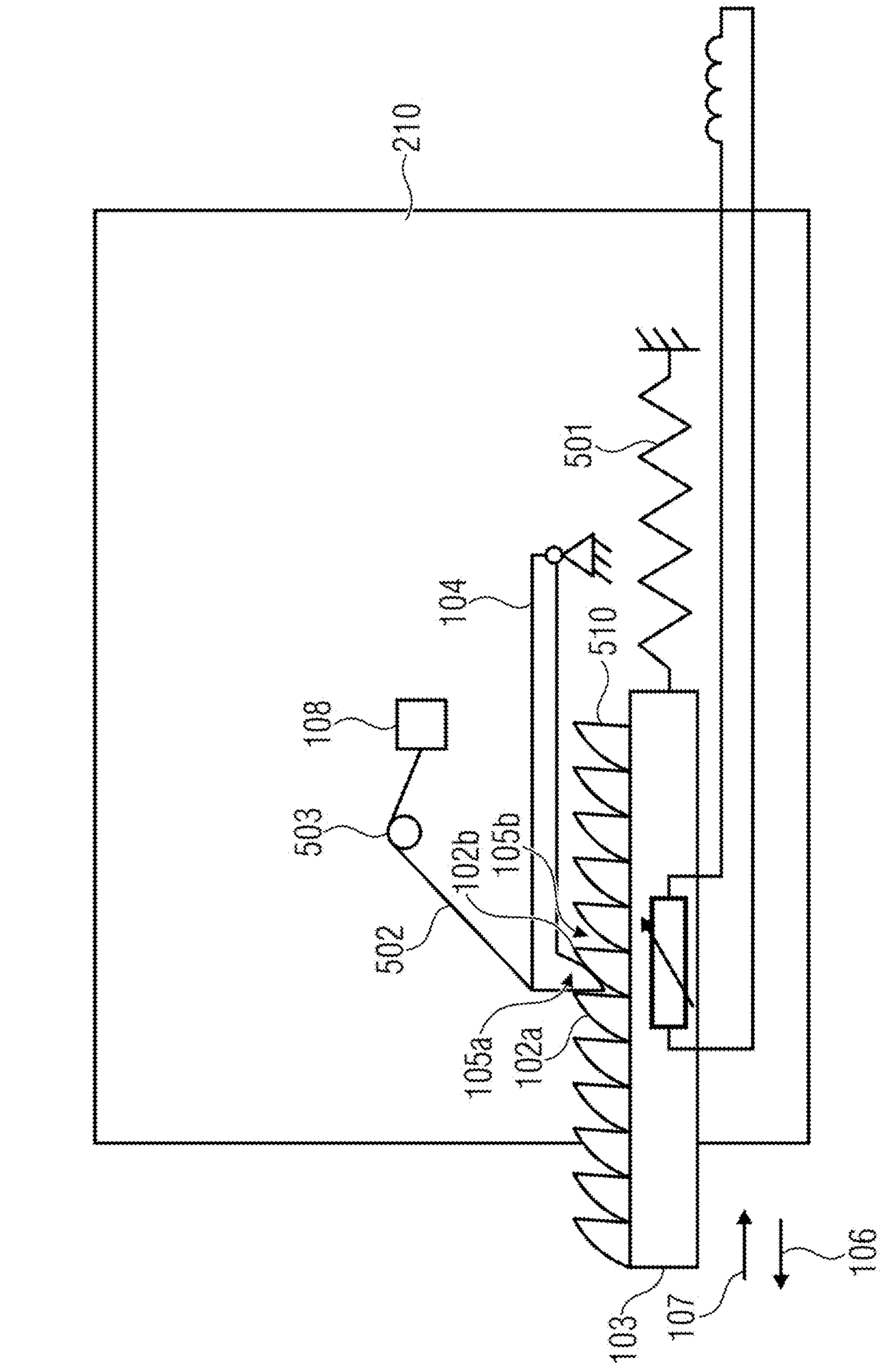
FIG. 8 shows a further schematic view of a catch element with an electrical component for reading out the counter status of the counter unit according to embodiments.

FIG. 8 shows such an embodiment. The embodiment shown here differs from the embodiment described above with reference to FIG. 7, among other things, in that the actuating device 108 here does not actuate the catch element 103, but rather the pawl 104.

The catch element 103 is pretensioned (or biased) here by means of a tensioning element 501. The tensioning element 501 may, for example, be a tension spring which is pulled apart in the initial state and thus pretensioned. In the example shown here, the catch element 103 could be pulled up to the last tooth in the freewheeling direction 106, against the tensile force of the tension spring 501. The pawl 104 engages in the last tooth intermediate space and blocks the movement of the catch element 103 in the blocking direction 107.

As mentioned in the beginning, the actuating device 108 here actuates the pawl 104. Here, the actuating device 108 does not have to directly contact the pawl 104, but rather the actuating device 108 may, for example, also be connected to the pawl 104 by means of connecting means 502. The actuating device 108 may also optionally comprise a deflection device 503 so that the actuating device 108 does not necessarily have to move the pawl 104 in the same direction as the deflection direction of the actuating device 108. Of course, this also applies to an actuating device 108 which actuates the catch element 103 instead of the pawl 104.

The catch element 103 is thus pretensioned by means of the tension spring 501, i.e. the tension spring 501 pulls the catch element 103 in the blocking direction 107. However, the pawl 104 blocks the movement of the catch element 103 in this blocking direction 107. During a movement of the pawl 104 which releases the engagement in a catch intermediate space 105*a*, the pretensioned catch element 103 moves due to the pretensioning of the tensioning element 501, i.e. the tension spring 501 pulls the catch element 103 in the blocking direction 107. This is only possible since the pawl 104 has released from the engagement with the catch intermediate space 105*a*. In this case, however, the catch element 103 is pushed further only by one catch 102*a*, 102*b* before the pawl 104 engages again in an adjacent next catch intermediate space 105*b*.

Instead of the tension spring just described, a compression spring could also be provided which pushes the catch element 103 in the blocking direction 107. In this case, however, the compression spring would act on the opposite side of the catch element 103 when compares to FIG. 8.

In order to prevent unbraked slipping of the catch element 103 relative to the (briefly non-engaging) pawl 104, a braking device, such as a further pawl, or a mechanical stop may be provided.

The electrical component 109 discussed with reference to FIGS. 6 to 8 can be used in all embodiments and variants of the present invention described here in order to determine the counter status of the counter unit. Preferably, both the first catch element 103 and the second catch element 203 may each comprise such an electrical component 109, with which the actual position of the respective catch element 103, 203 can be detected.

Apart from this, everything described using the example of the first catch element 103 with reference to FIGS. 6 to 8 also applies to the second catch element 203. In addition, the catch elements 103, 203 may optionally be embodied as gearwheels or gear racks.

Furthermore, the content of WO 2018/069 079 A1 is hereby incorporated by reference. The following embodiments are also part of the present disclosure:

A first embodiment relates to a limit value detection device (100) for multiple detection of a limit value event. The limit value detection device (100) may comprise a catch mechanism (101) manufactured in microstructuring technology, having a first catch element (103) and a second catch element (203), wherein each catch element (103, 203) may comprise a plurality of catches (102*a*, 102*b*, . . . , 102*n*; 220*a*, 220*b*, . . . , 220*m*) each. The limit value detection device (100) may additionally comprise a pawl (104) configured to engage in a catch intermediate space (105) between two adjacent catches (102*a*, 102*b*) of the first catch element (103), wherein the first catch element (103) is movable relative to the pawl (104) in a freewheeling direction (106) and movement of the first catch element (103) relative to the pawl (104) in a blocking direction (107) can be blocked by means of the pawl (104). The limit value detection device (100) may additionally comprise an actuating device (108) configured to move the first catch element (103) and the pawl (104) relative to each other in a catch-by-catch manner in the freewheeling direction (106). The first catch element (103) and the second catch element (203) together may form a counting unit in which the counter status for indicating the detected limit value events is determined on the basis of the position or positioning of the two catch elements (103, 203) relative to each other.

According to a second embodiment, which may be combined with the first embodiment, the catch mechanism (101) may be implemented as a microsystem (MEMS: microelectromechanical system).

According to a third embodiment, which may be combined with the first and/or second embodiment, the limit value detection device (100) may additionally comprise a substrate (210) on which the catch mechanism (101) is provided as a microsystem, and wherein an actuation device (108) is deflected horizontally, i.e. in a plane parallel to the substrate plane. The substrate plane denotes the plane in which the substrate extends and which is delimited or spanned by the lateral outer edges of the substrate. In the case of a wafer, for example, the substrate plane is approximately equivalent to the itself flat wafer. Movement within a plane parallel to the substrate plane may, for example, be a movement in or on the substrate.

According to a fourth embodiment, which may be combined with the first and/or second embodiment, the limit value detection device (100) may additionally comprise a substrate (210) on which the catch mechanism (101) is provided as a microsystem, and wherein the actuation device (108) is deflected vertically, i.e. perpendicularly to the substrate plane. Here, the limit value detection device may comprise a deflection device by means of which the deflection movement of the actuation device (108) directed vertically, i.e. perpendicularly to the substrate plane, is deflectable into a movement directed horizontally, i.e. parallel to the substrate plane. A vertical movement perpendicularly to the substrate plane would, for example, be a movement of the actuation device (108) out of the substrate plane, i.e. the actuation device (108) would, for example, move vertically or perpendicularly away from the substrate. A corresponding deflection device may, for example, be provided in the form of gearwheels, in particular bevel or worm gears. However, it would also be conceivable for the deflection device to comprise first and second deflection means, wherein the first deflection means has an inclined surface and the second deflection means is in contact with this inclined surface. If the second deflection means exerts pressure on the inclined surface, the first deflection means moves in a direction which is inclined to the direction of movement of the second deflection means. For example, in the case of an inclined surface with an angle of 45°, deflection from a horizontal into a vertical movement can be realized. In this case, the actuation of the pawl (104) or of the catch element (103, 203) does not take place directly by the actuation device (108) but indirectly by means of the deflection device arranged therebetween. This means that the actuation device (108) actuates the deflection device (perpendicularly to the substrate plane) and the deflection device actuates the pawl (104) or the catch element (horizontally to the substrate plane).

According to a fifth embodiment which may be combined with one or more of the preceding embodiments, the associated catches of a catch element (103, 203) may be arranged one behind the other along the respective catch element (103, 203) in the freewheeling direction so that the pawl (104) engages in succession from one catch intermediate space into the next adjacent catch intermediate space in the catch-by-catch movement. This distinguishes the inventive limit value detection device (100) from other devices which comprise only one catch element with a single catch and a pawl. While in such systems, a resetting mechanism is necessarily required after a single actuation, in the inventive limit value detection device (100) the catch elements (103, 203) can be moved multiple times relative to the pawl (104).

According to a sixth embodiment which may be combined with one or more of the preceding embodiments, the first and the second catch element (103, 203) may each be implemented in the form of a freely rotatable gearwheel in which the associated catches are formed in the form of toothing arranged radially on the outside or radially on the inside on the respective gearwheel (103, 203). Such a gearwheel may also be produced relatively easily using microsystem technology. In addition, the embodiment of the catch elements as a gearwheel offers the advantage that the gearwheel can be moved infinitely relative to the pawl (in a catch-by-catch manner). However, it would also be conceivable for an end stop to be provided which limits the number of catch-by-catch movements. For example, the end stop could limit further rotation of the gearwheel after a full rotation of the gearwheel. Thus, it can be avoided that the counting unit connected to the gearwheel is zeroed after a predetermined number of catch-by-catch movements or rotations of the gearwheel. Thus, it can be ensured that an overflow does not occur when reading out the counter status. However, an end stop may also be used in the case of gear racks and the like in order not to exceed a specific number of catch-by-catch movements.

According to a seventh embodiment which may be combined with one or more of the preceding embodiments, at least one of the two catch elements (103, 203) may be implemented in the form of a gear rack which is movable relative to the pawl (104) and in which the catches are formed in the form of toothing arranged on the gear rack. A gear rack may, for example, have a linear or else a curved shape. In the case of a curved shape, the toothing may be arranged on the inside, i.e. directed towards the center point of the radius of curvature, and/or on the outside, i.e. on the side of the gear rack facing away from the center point of the radius of curvature. It is conceivable for one of the two catch elements (103, 203) to be implemented in the form of a gear rack, while the respective other of the two catch elements (103, 203) is implemented in the form of a gearwheel. However, it is also conceivable for both catch elements (103, 203) to be implemented in the form of a gear rack.

According to an eighth embodiment which may be combined with one or more of the preceding embodiments, the actuating device (108) may actuate the first catch element (103) in order to move the first catch element (103) relative to the pawl (104) by one catch each in a catch-by-catch manner in the freewheeling direction (106). As already mentioned above, the actuating device (108) may actuate the first catch element (103) directly or indirectly. An actuation of the first catch element (103) has the advantage that the pawl (104) may be arranged in a stationary manner while the first catch element (103) is moved in the freewheeling direction. The catch-by-catch movement of the pawl (104) from one catch intermediate space to the next catch intermediate space in the freewheeling direction may take place here, for example, by suitably shaping the catches (102*a*, 102*b*, . . . , 102*n*) and the pawl (104) so that the pawl (104) slides over the catch along the catch flank and latches into the adjacent catch intermediate space during movement of the first catch element (103).

According to a ninth embodiment which may be combined with the eighth embodiment, the actuating device (108) may engage on a catch (102*a*, 102*b*, . . . , 102*n*) of the first catch element (103) in order to move the first catch element (103) relative to the pawl (104) in a catch-by-catch manner. Thus, the actuating device (108) may, for example, engage on a tooth of a gearwheel and move the gearwheel directly by one tooth. This is a relatively simple possibility of actuating the first catch element since no further deflection levers, etc. are required.

According to a tenth embodiment which may be combined with one or more of the preceding embodiments, the first catch element (103) may be pretensioned by means of a tensioning element (501) and the actuating device (108) may actuate the pawl (104), wherein during a movement of the pawl (104) which releases the engagement in a catch intermediate space (105*a*), the pretensioned first catch element (103) moves on by one catch (102*a*, 102*b*) due to the pretensioning before the pawl (104) engages again in an adjacent next catch intermediate space (105*b*) of the first catch element (103). This would have the advantage that, for example, in the case of a gearwheel which is theoretically infinitely rotatable, the pretensioning is selected only to such an extent that the gearwheel executes only a predetermined maximum number of catch-by-catch movements. Thus, it can be ensured that an overflow does not occur when reading out the counter status. Alternatively or additionally, providing an above-mentioned end stop would also be conceivable here.

According to an eleventh embodiment which may be combined with one or more of the preceding embodiments, the actuating device (108) may be thermally deflectable. Thus, thermal limit value exceedances can be measured.

According to a twelfth embodiment which may be combined with one or more of the preceding embodiments, the actuating device (108) may be a thermal bending transducer, and/or the actuating device (108) may comprise a shape memory alloy. A thermal bending transducer is to be understood as a component which changes its shape depending on the temperature. The thermal bending transducer may, for example, deform in a first direction when a limit value temperature is exceeded. When this limit value temperature is fallen below, the thermal bending transducer returns to its starting position again, i.e. it deforms again in the other direction. A thermal bending transducer may also be a component known in English under the name bimorph. Such a bimorph comprises two or more active regions which are actuatable separately from one another. A thermal bimorph, for example, comprises two active regions which deform in a first direction when a limit value temperature is exceeded. When this limit value temperature is fallen below, the two active regions move back into their starting position again, i.e. in an opposite second direction. The two active regions may have different coefficients of thermal expansion. As a result, the amount of deformation of the two active regions is of different magnitude, which in turn results in a mechanical deflection of the bimorph. The thermal bimorph may thus move in two directions in response to a limit value temperature being fallen below or exceeded.

According to a thirteenth embodiment which may be combined with one or more of the preceding embodiments, the actuating device (108) may be mechanically or electrically deflectable. For example, the actuating device (108) may be mechanically deflectable using specific forces, for example pressure. This may be, for example, a barometric pressure, i.e. the actuating device (108) may be used, for example, in diving chronographs and may indicate the number of dives. However, the actuating device (108) may also be deflectable, for example, by acceleration forces. Thus, for example, it can be detected whether and how often a device has dropped from a specific height, or the number of speed violations in vehicles can be detected.

According to a fourteenth embodiment which may be combined with one or more of the preceding embodiments, the actuating device (108) may be configured to be deflected when a predefined limit value is exceeded and/or fallen below in order to move the first catch element (103) and the pawl (104) relative to each other by means of this deflection in a catch-by-catch manner in the freewheeling direction (106). Such a limit value may be, for example, a predefined amount of a temperature, a pressure, an acceleration or other thermal, electrical or mechanical forces, depending on the force (e.g. thermal, electrical, mechanical) by which the actuating device (108) is deflectable. This may be both an upper and a lower limit value. The actuating device (108) actuates the pawl and/or the first catch element (103) only if the force deflecting the actuating device (108) falls below or exceeds the limit value. This means that only if the predefined limit value is fallen below or exceeded is the deflection of the actuating device (108) sufficient to move the first catch element (103) and the pawl (104) relative to each other.

According to a fifteenth embodiment which may be combined with one or more of the preceding embodiments, the limit value detection device (100) may comprise an electrical component (109) configured to change its electrical property depending on the positioning or position of the two catch elements (103, 203) relative to each other. Thus, the electrical component (109) may change its electrical property, for example, each time the catch mechanism (101), i.e. the first catch element (103) has moved on relative to the second catch element (203). The variable electrical property of the electrical component (109) may assume a specific value for each individual position of the catch mechanism (101), i.e. of the first catch element (103) relative to the second catch element (203). For example, the electrical component (109) may be a variable resistor, a capacitor or else a coil, the respective magnitude (resistance, capacitance, inductance) of which changes with each catch-by-catch movement of the catch mechanism (101). Conversely, each individual resistance, capacitance or inductance value is thus characteristic and unambiguous for a specific position or positioning of the first catch element (103) relative to the second catch element (203). The current position or positioning of the catch mechanism (101), or of the first catch element (103) relative to the second catch element (203), can thus be deduced from the current measured value of the electrical component (109). Accordingly, it can in turn be deduced from this determined position or positioning of the catch mechanism (101) by how many catches the two catch elements (103, 203) have already moved on each (starting from a start position), i.e. how often the limit value has already been exceeded or fallen below. Thus, not only can the occurrence of a limit value event be detected, but the inventive limit value detection device (100) is also able to detect and possibly store the number of limit value exceedances by means of the electrical component (109).

According to a sixteenth embodiment which may be combined with the fifteenth embodiment, the electrical component (109) may be a capacitor or a resistor or a coil or an electro-optical element. All these electrical components are suitable for detecting even the smallest changes in their electrical behavior.

According to a seventeenth embodiment which may be combined with the fifteenth and/or the sixteenth embodiment, the electrical component (109) may be an adjustable member of an RFID resonant circuit (207). The electrical component (109) could thus be, for example, an electric consumer with variable resistor, a capacitor with variable capacitance or a coil with variable inductance, wherein the respective electrical property thereof varies depending on the variable to be determined (e.g. temperature, pressure, etc.). With a change of the electrical property, the resonant frequency of the entire RFID resonant circuit (207) also changes. The (active or passive) RFID resonant circuit (207) can thus be read out, for example, with an RFID reader, wherein the frequency of the resonant circuit may be an indicator for the current value of the respective adjustable electrical component (109), and thus at the same time also an indicator for the current position of the catch mechanism (101).

According to an eighteenth embodiment which may be combined with the fifteenth, sixteenth or seventeenth embodiment, the limit value detection device (100) may additionally comprise a substrate (210) on which the catch mechanism (101) is arranged, and the electrical component (109) may be arranged between the catch mechanism (101) and the substrate (210). Thus, for example, a movement of the catch mechanism (101) relative to the substrate (210) may result in a change in the electrical property of the electrical component (109). Additionally, this arrangement is space-saving since the electrical component (109) may, for example, be integrated directly into the substrate (210) and thus not be arranged next to the catch mechanism (101), but directly below the catch mechanism (101). The electrical component (109) may, for example, be structured into a semiconductor substrate 210 as a corresponding component structure (capacitor, transistor, diode, resistor, etc.).

According to a nineteenth embodiment which may be combined with the fifteenth, sixteenth, seventeenth or eighteenth embodiment, the limit value detection device (100) may additionally comprise a substrate (210) on which the catch mechanism (101) is provided, and the electrical component (109) may be a capacitor, wherein a first capacitor plate (201) is provided on the substrate (210) and a second capacitor plate (202) is provided on the catch mechanism (101) and/or on the pawl (104), and wherein during a catch-by-catch movement of the catch mechanism (101) and/or the pawl (104) relative to the substrate (210), the alignment of the capacitor plates (201, 202) relative to each other changes so that the capacitor capacitance changes.

According to a twentieth embodiment which may be combined with one or more of the preceding embodiments, the limit value detection device (100) may be implemented as a sterilization cycle counter in which the actuation means (108) moves the catch mechanism (101) on by exactly one catch (102*a*, 102*b*) after a sterilization process has been performed.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A limit value detection device for multiple detection of a limit value event, comprising:

a catch mechanism manufactured using microstructuring technology, comprising a first catch element and at least a second catch element, wherein each catch element comprises a plurality of catches each, wherein the catches of the first catch element engage in the catches of the second catch element, such that the first catch element moves the second catch element continuously and also in a catch-by-catch manner during a catch-by-catch movement, a pawl configured to engage in a catch intermediate space between two adjacent catches of the first catch element, wherein the first catch element is movable relative to the pawl in a freewheeling direction and movement of the first catch element relative to the pawl in a blocking direction is blockable by means of the pawl, and an actuating device configured to move the first catch element and the pawl relative to each other in a catch-by-catch manner in the freewheeling direction, wherein the catch elements of the catch mechanism together form a counting unit in which the counter status for indicating the detected limit value events is determined on the basis of the position or positioning of the catch elements relative to each other, wherein the individual catch elements of the catch mechanism can each assume a plurality of different unique positions relative to each other, wherein each of these unique positions represents exactly one counter status of the counting unit, and wherein the counter status is indicated in the sense of a coding, in which the number of possible unique positions of the individual catch elements relative to each other determines the number of available code words.

2. The limit value detection device according to claim 1, wherein the number of catches of the first catch element differs from the number of catches of the second catch element.

3. The limit value detection device according to claim 1, wherein the number of catches of the first catch element and the number of catches of the second catch element do not comprise a greatest common divisor except 1.

4. The limit value detection device according to claim 1, wherein the first catch element comprises fewer catches and a smaller diameter than the second catch element.

5. The limit value detection device according to claim 1, wherein the catch mechanism also comprises one or more additional catch elements in addition to the first and second catch elements, wherein each additional catch element engages in the catches of the first catch element such that the first catch element also moves the second and all additional catch elements.

6. The limit value detection device according to claim 1, wherein the catch mechanism also comprises one or more additional catch elements in addition to the first and second catch elements, wherein, in the sense of a series connection, every two adjacent ones of the catch elements engage with each other.

7. The limit value detection device according to claim 1, additionally comprising:

an end stop configured to prevent further movement of the catch elements after a complete counting pass of the counter unit.

8. The limit value detection device according to claim 7, wherein the end stop comprises a first and a second stop element, and wherein the first stop element is arranged in a catch intermediate space of the first or second catch element, and thus protrudes further from the outer circumference of the respective catch element than its respective catches, such that the catches run past the second stop element in an unhindered manner while the first stop element strikes the second stop element.

9. The limit value detection device according to claim 1, wherein the microstructured limit value detection device is arranged on a substrate, and wherein movement of the actuation device takes place in a plane parallel to the substrate plane.

10. The limit value detection device according to claim 1, wherein the catch elements of the catch mechanism are each configured in the form of a gearwheel, and wherein the associated catches are each configured in the form of toothing arranged radially on the outside or radially on the inside on the respective catch element.

11. The limit value detection device according to claim 1, wherein the limit value detection device is configured as a sterilization cycle counter in which the counter unit increases the counter status by one after each successfully performed sterilization process.

12. A limit value detection device for multiple detection of a limit value event, comprising:

a catch mechanism manufactured using microstructuring technology, comprising a first catch element and at least a second catch element, wherein each catch element comprises a plurality of catches each, a pawl configured to engage in a catch intermediate space between two adjacent catches of the first catch element, wherein the first catch element is movable relative to the pawl in a freewheeling direction and movement of the first catch element relative to the pawl in a blocking direction is blockable by means of the pawl, and an actuating device configured to move the first catch element and the pawl relative to each other in a catch-by-catch manner in the freewheeling direction, wherein the catch elements of the catch mechanism together form a counting unit in which the counter status for indicating the detected limit value events is determined on the basis of the position or positioning of the catch elements relative to each other, wherein the limit value detection device comprises a second pawl configured to engage in a catch intermediate space between two adjacent catches of the second catch element, wherein the second catch element is movable relative to the second pawl in a freewheeling direction and movement of the second catch element relative to the second pawl in a blocking direction is blockable by means of the second pawl, and wherein the actuating device is configured to move the second catch element relative to the second pawl in a catch-by-catch manner in the freewheeling direction.

13. The limit value detection device according to claim 12, wherein, during actuation, the actuating device moves both the first catch element and the second catch element together by one catch each.

14. A limit value detection device for multiple detection of a limit value event, comprising:

a catch mechanism manufactured using microstructuring technology, comprising a first catch element and at least a second catch element, wherein each catch element comprises a plurality of catches each, a pawl configured to engage in a catch intermediate space between two adjacent catches of the first catch element, wherein the first catch element is movable relative to the pawl in a freewheeling direction and movement of the first catch element relative to the pawl in a blocking direction is blockable by means of the pawl, and an actuating device configured to move the first catch element and the pawl relative to each other in a catch-by-catch manner in the freewheeling direction, wherein the catch elements of the catch mechanism together form a counting unit in which the counter status for indicating the detected limit value events is determined on the basis of the position or positioning of the catch elements relative to each other, wherein the catches of the first catch element and the catches of the second catch element do not engage in one another, and wherein, in addition to the plurality of catches, the first catch element comprises a drive element configured to engage in the catches of the second catch element in order to move the second catch element on in a catch-by-catch manner.

15. The limit value detection device according to claim 14, wherein, per completed 360° rotation of the first catch element, the drive element moves the second catch element by one catch each.

16. The limit value detection device according to claim 14, wherein the first catch element comprises exactly one single drive element.

17. The limit value detection device according to claim 14, wherein the first catch element is of annular configuration, and the catches are arranged in the form of external toothing on the outer circumference of the annular first catch element, and wherein the drive element is arranged on the inner circumference of the annular first catch element.

18. The limit value detection device according to claim 17, wherein the outer diameter of the second catch element is smaller than the inner diameter of the annular first catch element, and wherein the second catch element is arranged inside the annular first catch element.

* * * * *